US011489622B2

(12) United States Patent
Djordjevic et al.

(10) Patent No.: US 11,489,622 B2
(45) Date of Patent: Nov. 1, 2022

(54) PROBABILISTICALLY CODED MODULATION FOR FRONTHAUL NETWORKS

(71) Applicant: ARIZONA BOARD OF REGENTS ON BEHALF OF THE UNIVERSITY OF ARIZONA, Tucson, AZ (US)

(72) Inventors: Ivan Djordjevic, Tucson, AZ (US); Houman Rastegarfar, Natick, MA (US); Mingwei Yang, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 17/346,234

(22) Filed: Jun. 12, 2021

(65) Prior Publication Data

US 2021/0391943 A1    Dec. 16, 2021

Related U.S. Application Data

(60) Provisional application No. 63/038,668, filed on Jun. 12, 2020.

(51) Int. Cl.
*H04L 1/00* (2006.01)
*H04B 10/572* (2013.01)
*H04B 10/548* (2013.01)

(52) U.S. Cl.
CPC ......... *H04L 1/0041* (2013.01); *H04B 10/548* (2013.01); *H04B 10/572* (2013.01); *H04L 1/0058* (2013.01)

(58) Field of Classification Search
CPC ....... H04L 1/0003; H04L 1/203; H04L 1/041; H04L 1/061; H04B 10/616; H04B 10/548
See application file for complete search history.

(56) References Cited

U.S. PATENT DOCUMENTS

| 2015/0003384 A1* | 1/2015 | Kawasaki | H04B 7/26 370/329 |
| 2016/0301475 A1* | 10/2016 | Li | H04B 10/616 |
| 2019/0319765 A1* | 10/2019 | El Mghazli | H04L 5/0053 |

OTHER PUBLICATIONS

Iovanna et al., "Future Proof Optical Network Infrastructure for 5G Transport", IEEE/OSA J. Opt. Commun. Netw., vol. 8, No. 12, pp. B80- B92, Dec. 2016.

(Continued)

*Primary Examiner* — Shelly A Chase
(74) *Attorney, Agent, or Firm* — Grossman, Tucker, Perreault & Pfleger, PLLC

(57) ABSTRACT

A controller to communications between a baseband unit (BBU) and a remote radio head (RRH) in a mobile fronthaul (MFH) network. The controller to initialize a pseudorandom seeding in the BBU and RRH and to cause the BBU and RRH to generate a pair of matching pseudorandom bit sequences (PRBS) to enable the BBU and RRH to synchronize communications therebetween; to select a wavelength and to select a route, through the MFH network, to enable the BBU and RRH to communicate using the selected wavelength and route; to select an error correction code and a modulation format for communications between the BBU and RRH; to encode one or more parameters of a physical layer in the MFH network into the PRBS; and to monitor a data stream between the BBU and RRH to determine if a bit error rate has changed for each frame of the data stream.

20 Claims, 18 Drawing Sheets

(56) References Cited

OTHER PUBLICATIONS

Ruffini et al., "Access and Metro Network Convergence for Flexible End-to-End Network Design", IEEE/OSA J. Opt. Commun. Netw., vol. 9, No. 6, pp. 524-535, Jun. 2017.
Tzanakaki et al., "Wireless-Optical Network Convergence: Enabling the 5G Architecture to Support Operational and End-User Services", IEEE Com-mun. Mag., vol. 55, No. 10, pp. 184-192, Oct. 2017.
Rastegarfar et al., "Optical Layer Routing Influence on Software-Defined C-RAN Survivability", IEEE/OSA J. Opt. Commun. Netw., vol. 10, No. 11, pp. 866-877, Nov. 2018.
Raza et al., "Demonstration of Dynamic Resource Sharing Benefits in an Optical C-Ran", IEEE/OSA J. Opt. Commun. Netw., vol. 8, No. 8, pp. 621-632, Aug. 2016.
Oehlen et al., "Data Plane and Control Architectures for 5G Transport Networks", J. Lightw. Technol., vol. 34, No. 6, pp. 1501-1508, Mar. 2016.
Liu et al. "Network Densification in 5G: From the Short-Range Communications Perspective", IEEE Commun. Mag., vol. 55, No. 12, pp. 96-102, Dec. 2017.
Agyapong et al., "Design Considerations for a 5G Network Architecture", IEEE Commun. Mag., vol. 52, No. 11, pp. 65-75, Nov. 2014.
Wang et al., "Backhauling 5G Small Cells: A Radio Resource Management Perspective", IEEE Wireless Commun., vol. 22, No. 5, pp. 41-49, Oct. 2015.
Yousaf et al., "NFV and SDN—Key Technology Enablers for 5G Networks", IEEE J. Sel. Areas Commun., vol. 35, No. 11, pp. 2468-2478, Nov. 2017.
Ou et al., "Optical Network Virtualization Using Multitechnology Monitoring and SDN-Enabled Optical Transceiver", J. Lightw. Technol., vol. 36, No. 10, pp. 1890-1898, May 2018.
Karanov et al., "End-to-End Deep Learning of Optical Fiber Communications", J. Lightw. Technol., vol. 36, No. 20, pp. 4843-4855, Oct. 2018.
Alvizu et al., "Matheuristic with Machine-Learning-Based Prediction for Software-Defined Mobile Metro-Core Networks", IEEE J. Opt. Commun. Netw., vol. 9, No. 9, pp. D19-D30, Sep. 2017.
Rottondi et al., "Machine-Learning Method for Quality of Transmission Prediction of Unestablished Light-Paths", IEEE/OSA J. Opt. Commun. Netw., vol. 10, No. 2, pp. A286-A297, Feb. 2018.
Pfeiffer, "Next Generation Mobile Fronthaul and Midhaul Architectures", IEEE/OSA J. Opt. Commun. Netw., vol. 7, No. 11, pp. B38-B45, Nov. 2015.
Alimi et al., "Toward an Efficient C-RAN Optical Fronthaul for the Future Networks: A tutorial on Technologies, Requirements, Challenges, and Solutions", IEEE Commun Surveys Tuts., vol. 20, No. 1, pp. 708-769, Jan./Mar. 2018.
Biermann et al., "How Backhaul Networks Influence the Feasibility of Coordinated Multipoint in Cellular Networks", IEEE Commun. Mag., vol. 51, No. 8, pp. 168-176, Aug. 2013.
Beyranvand et al., "Toward 5G: FiWi Enhanced LTE-A HetNets with Reliable Low-Latency Fiber Backhaul Sharing and WiFi Offloading", IEEE/ACM Trans. Netw., vol. 25, No. 2, pp. 690-707, Apr. 2017.
Zhang et al., "Reconfigurable Optical Mobile Fronthaul Networks for Coordinated Multipoint Transmission and Reception in 5G", IEEE J. Opt. Commun. Netw., vol. 9, No. 6, pp. 489-497, Jun. 2017.
Zhang et al., "Low-Cost WDM Fronthaul Enabled by Partitioned Asymmetric AWGR with Simulta-Neous Flexible Transceiver Assignment and Chirp Management", IEEE/OSA J. Opt. Commun. Netw., vol. 9, No. 10, pp. 876-888, Oct. 2017.
Yang et al., "SDN-Enabled Cross-Layer Flexibility in 5G Fronthaul Networks", in Proc. Eur. Conf. Opt. Commun., Sep. 2018, Paper We4B.1.
Yang et al., "Physical-Layer Adaptive Resource Allocation in Software-Defined Data Center Networks", IEEE/OSA J. Opt. Commun. Netw., vol. 10, No. 12, pp. 1015-1026, Dec. 2018.
Rastegarfar et al., "PAM Performance Analysis in Multicast-Enabled Wavelenght-Routing Data Centers", J. Lightw. Technol., vol. 35, No. 13, pp. 2569-2579, 2017.
Hadi et al., "Analysis and Design of Adaptive OCDMA Passive Optical Networks", J. Lightw. Technol., vol. 35, No. 14, pp. 2853-2863, 2017.
Yang et al., "Secure Bidirectional Adaptive Resource Allocation in SDN-Enabled 5G Fronthaul Networks", in Proc. Asia Conf. Commun. Photon., 2018, Paper M1E.5.
Vu et al., "Weighted Max-Min Fairness for C-RAN Multicasting Under Limited Fronthaul Constraints", IEEE Trans. Commun., vol. 66, No. 4, pp. 1534-1548, 2018.
Fossorier, "Quasi-Cyclic Low-Density Parity-Check Codes from Circulant Permutation Matrices", IEEE Trans. Inf. Theory, vol. 50, No. 8, pp. 1788-1794, 2004.
Westerberg, "4G/5G RAN architecture: How a split can make the difference", ERICSSON, Stockholm, Sweden, Tech. Rep. 6, 2016, pp. 1 to 6.

\* cited by examiner

| | PI-PAM-3 | PAM-3 | BPSK | OOK | PI-QAM-5 | QAM-5 | QPSK |
|---|---|---|---|---|---|---|---|
| IQ MOD GENERATED | IMPROVED PAM-3 | NORMAL PAM-3 | BPSK | OOK | IMPROVED QAM-5 | NORMAL QAM-5 | QPSK |
| VIEWED BY DIRECT DETECTOR | OOK WITH IMBALANCED NOISE | OOK WITH TRANSIENT AND IMBALANCED NOISE | N/A | OOK | OOK WITH IMBALANCED NOISE | OOK WITH TRANSIENT AND IMBALANCED NOISE | N/A |
| VIEWED BY COHERENT DETECTOR | PI-PAM-3 | PAM-3 | BPSK | OOK | PI-QAM-5 | QAM-5 | QPSK |

FIG. 4

PROBABILISTICALLY CODED MODULATION FOR FRONTHAUL NETWORKS

CROSS REFERENCE TO RELATED APPLICATIONS

This application claims the benefit of U.S. Provisional Application Ser. No. 63/038,668 filed Jun. 12, 2020, which is hereby incorporated by reference in its entirety.

STATEMENT OF GOVERNMENT RIGHTS

This invention was made with government support under Grant No. EEC0812072, awarded by NSF. The government has certain rights in the invention.

FIELD

The present disclosure relates to probabilistically coded modulation for fronthaul networks.

BACKGROUND

The next generation of cellular networks (5G/6G and above) are emerging to support disruptive applications and services including the Internet of Things (IoT), smart city infrastructure, autonomous driving, and augmented/virtual reality. Compared to the existing deployments, 5G networks call for 1,000 times higher traffic rates, up to 100 times more connections, up to 10 Gb/s stationary access rates, and significantly lower end-to-end latencies and higher reliabilities. These performance indicators require innovative solutions in multiple technology domains, including the densification of wireless access points in hybrid network architectures, the use of new frequency bands and advanced signal processing schemes, software-defined networking (SDN) and network function virtualization (NFV), and scalable and adaptive resource allocation mechanisms based on machine learning techniques.

From a network architecture perspective, the densification of radio access points in a tiered heterogeneous network (HetNet) and the centralization of baseband processing functions are two major design trends in 5G implementations. The centralized/cloud radio access architecture (C-RAN) has been proposed to support these requirements in a power- and cost-efficient fashion. In the C-RAN architecture, legacy base stations are split into baseband processing units (BBUs) and remote radio heads (RRHs). The BBUs are organized into central offices (i.e., BBU pools) for statistical multiplexing and coordinated multipoint (CoMP) services, and the RRHs are left simple to handle the radio functionalities cost-effectively. The interface between the BBU pool(s) and the RRHs is known as the mobile fronthaul (MFH) network, whereas the interface between the BBU resources and the Evolved Packet Core (EPC) is the backhaul network.

In a 5G network implementation, one of the major requirements is the integration of heterogeneous resources and technologies. For instance, small cells should be envisioned along with legacy macro cells for improved network coverage and capacity. From a transmission perspective, hybrid solutions involving both coherent detection (CD) and direct detection (DD) technologies can support a multi-vendor fronthaul segment and enable different bit rates per antenna site. Although CD technologies provide higher capacities over longer distances, CD infrastructure cannot replace the entire DD infrastructure in a radio access network at once. In the short to medium run, both DD and CD technologies are expected to contribute to 5G optical transport networks, with CD technologies gaining more market penetration as price points drop. Therefore, hybrid MFH connectivity solutions supporting both DD and CD node types is a significant research and engineering problem.

In a 5G deployment, the properties of the underlying fronthaul and backhaul (X-haul) networks can have a profound impact on the performance of the radio access. Specifically, the multiplicity of the radio nodes, the high traffic rates per cell site, and the latency and capacity requirements imposed by coordination schemes and standards such as the Common Public Radio Interface (CPRI) protocol pose significant challenges to designing MFH networks. The immense capacity of optical fiber networks makes them a promising candidate for implementing MFH networks. However, a static, overprovisioned, legacy optical network implementation with rigid BBU-RRH connections of fixed capacity is neither scalable nor sustainable due to the exponential growth of 5G traffic. The 5G optical transport solutions have to be highly programmable to maximize statistical multiplexing gains by steering the limited processing and bandwidth resources depending on the temporal and spatial application traffic properties. To achieve a highly flexible and cost-efficient C-RAN, SDN can be employed to enable dynamic connections when and where needed.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 4 illustrates a summary chart of improved PAM-3 and QAM-5 modulation formats to achieve optimal spectral efficiency according to one embodiment of the present disclosure;

Although the following Detailed Description will proceed with reference being made to illustrative embodiments, many alternatives, modifications and variations thereof will be apparent to those skilled in the art.

DETAILED DESCRIPTION

MFH Network Description

Figure 1:
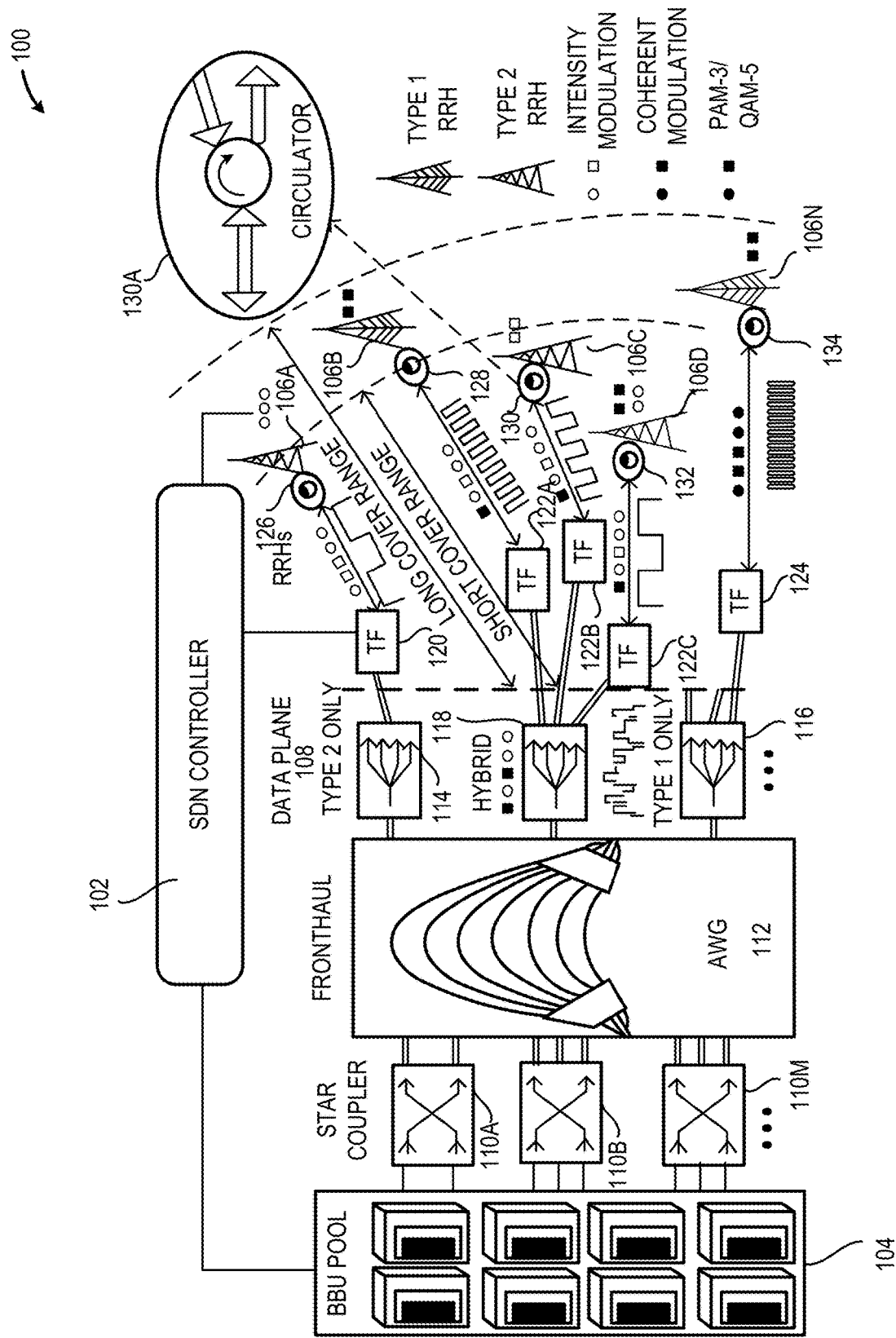
FIG. 1 illustrates a mobile fronthaul (MFH) network according to various embodiments of the present disclosure.

FIG. 1 illustrates a mobile fronthaul (MFH) network 100 according to various embodiments of the present disclosure. As described herein, the MFH network 100 of the present disclosure is generally configured to flexibly steer and allocate resources when and where they are needed, without overprovisioning. The MFH network 100 provides programmable optical transmission, including the hybrid MFH network architecture and SDN-enabled pseudorandom encoding for cross-layer connection rate adaptation, as will be described in greater detail below.

The MFH network 100 includes an SDN controller 102 generally configured to control routing and modulation formats for optical communication exchange of commands and data between a BBU pool 102 and a plurality of RRHs 106A, 106B, 106C, ..., 106N via an optical link. The RRHs 106A, 106B, 106C, ..., 106N may each be configured to support (decode/encode) a plurality of modulation formats. For example, one or more of the RRHs 106A, 106B, 106C, ..., 106N may be configured to support a coherent detection (CD) modulation format using, for example, PSK, QPSK and/or QAM, etc. modulation format (referred to herein as a Type 1 RRH). One or more of the RRHs 106A, 106B, 106C, ..., 106N may be configured to support a direct detection (DD) modulation format using, for example, PAM and/or OOK, etc. modulation format (referred to herein as a Type 2 RRH). One or more of the RRHs 106A, 106B, 106C, ..., 106N may be configured to support both CD and DD modulation formats (referred to herein as a Hybrid RRH). The BBU pool 104 may likewise be configured to support (encode/decode) DD, CD and both DD and CD modulation formats. A data plane 108, associated with the BBU pool 104, generally includes optical communication devices to enable communication between the BBU pool 106 and the plurality of RRHs 106A, 106B, 106C, ..., 106N via one or more optical communication links (e.g., optical fiber connections, etc.). The BBU pool 104, as is understood, is generally configured to fetch and receive data from backhaul connections such as data centers, networks, internet, etc. The BBU pool 104 includes hardware and software instances to convert data packets between electrical signals and optical signals, as is known.

The data plane 108 includes optical star coupler circuitry 110A, 110B, ..., 110M are each configured to combine two or more optical signals from the BBU pool 104. Each of the optical star coupler circuitry 110A, 110B, ..., 110M include a plurality of input ports to receive a plurality of optical signal streams, each having a unique wavelength, from the BBU pool, and a plurality of output ports to provide combined optical signal streams. The data plane 108 also includes arrayed waveguide grating (AWG) circuitry 112 to provide cyclic routing and provide passive routing of single or multiple signals from the optical star coupler circuitry 110A, 110B, ..., 110M. The AWG circuitry 112 includes a plurality of input ports coupled to the output ports of the optical star coupler circuitry 110A, 110B, ..., 110M, and plurality of output ports. The AWG circuitry 112 is generally configured to route an optical signal (generated by the BBU pool 104) to an output port based on the input port and the wavelength of the optical signal.

The data plane 108 also includes power splitter circuitry 114, 116, 118 coupled to the output ports of the AWG circuitry 112. The power splitter circuitry 114, 116, 118 are each configured to generate a plurality of optical signals, based on the input from the AWG circuitry 112, to enable, for example, broadcasting of a selected optical signal to a plurality of RRHs 106A, 106B, 106C, ..., 106N. The power splitter circuitry 114, 116, 118 are also configured to provide power gain functions to each of the generated optical signals based on, for example, a distance between the BBU pool 104 and a targeted RRH from among the plurality of RRHs 106A, 106B, 106C, ..., 106N (for example, a long distance optical link may require more transmission power than shorter distance optical link, etc.). To enable hybrid DD/CD communications in network 100, the power splitter circuitry may be designated for selected RRHs that support DD only, CD only, and both DD and CD modulation formats. For example, as illustrated in FIG. 1, power splitter circuitry 114 is designated as a Type 2 device that supports DD modulation formats, power splitter circuitry 116 is designated as a Type 1 device that supports CD modulation formats, and power splitter circuitry 118 is designated as a Hybrid device that supports both DD and CD modulation formats. Of course, this is only an example, and it is not intended to be limiting in terms of the number of such power splitters or the topology arrangement of such power splitters.

The system 100 also includes tunable filter circuitry (filter circuitry) 120, 122A, 122B, 122C and 124, associated with the power splitter circuitry 114, 116, 118. Each of the tunable filter circuitry 120, 122A, 122B, 122C and 124 is configured to select a desired optical signal wavelength allocated to a given RRH, thus eliminating all wavelengths except the wavelength selected for communication between the BBU pool and a target RRH. In the illustrated network 100 of FIG. 1, filter circuitry 120 is associated with power splitter circuitry 114 to controllably select a wavelength during DD (Type 2) communications between the BBU pool 104 and RRH 106A. Continuing this example, filter circuitry 122A, 122B and 122C are each associated power splitter circuitry 118 to controllably select a wavelength during DD (Type 2) and/or CD (Type) communications between the BBU pool 104 and RRH 106B, 106C and 106D, respectively. Continuing this example, filter circuitry 124 is associated with power splitter circuitry 116 to controllably select a wavelength during CD (Type 1) communications between the BBU pool 104 and RRH 106N. Of course, this is only an example, and it is not intended to be limiting in terms of the number of such filter circuitry or the topology arrangement of such filter circuitry.

The network 100 may also include one or more circulator circuitry 126, 128, 130, 132, 134 associated with each respective RRH 106A, 106B, 106C, . . . , 106N. The circulator circuitry enables the same optical link to provide simultaneous uplink and downlink communication between an RRH and the BBU pool 104 using, for example, code division multiplexing (CDMA) communications protocols. Taking circulator circuitry 130 as an example, and referring to the exploded view 130A of circuitry 130, the circuitry 130 includes a common I/O port on the BBU side, and separate input and output ports on the RRH side. Inbound traffic into the circulator 130 gets routed to the next output port of the circulator 130.

In a downlink operation of network 100 (i.e., communication from the BBU pool 104 to one or more RRHs 106A, 106B, 106C, . . . , 106N), SDN controller circuitry 102 controls the BBU pool 104 to select a wavelength and output port to use for a downlink communications instance. The AWG circuitry 112 steers the traffic to one or more of the power splitter circuitry 114, 116, 118, based on the selected wavelength and output port (which is an input port to the AWG circuitry 112). The SDN controller circuitry 102 controls an appropriate tunable filer circuitry 120, 122A, 122B, 122C, and/or 124 to filter all wavelengths except the selected wavelength. Encoder circuitry (not shown in this figure) encodes the data packets into a frame using one or more of a CD modulation format (e.g., PSK, QPSK and/or QAM, etc.), a DD modulation format (e.g., PAM, OOK, etc.) and/or both CD and DD modulation formats depending on which formats are supported at a target RRH 106A, 106B, 106C, . . . , 106N.

In FIG. 1, intensity modulated signals are represented by white circles/squares with no outline. They transfer information to the RRHs only via amplitude. On the other hand, coherent modulated signals with fixed amplitude (e.g., binary phase-shift keying (BSPK) and quadrature phase-shift keying (QPSK)) may be used to transfer information using phase. They are denoted by transparent circles/squares with solid outline. In addition, as will be described below, the present disclosure also provides improvements to PAM-3 and QAM-5 in order to use both amplitude and phase dimensions for carrying information. These signaling schemes (represented by white circles/squares with solid outline) can be used by both types of RRH nodes. Type 1 RRHs extract both amplitude and phase information and type 2 RRHs make use of the information encoded in the amplitude of the signals. From a transmission viewpoint, hybrid solutions support a multivendor fronthaul design and enable different bit rates per antenna site.

Figure 2:
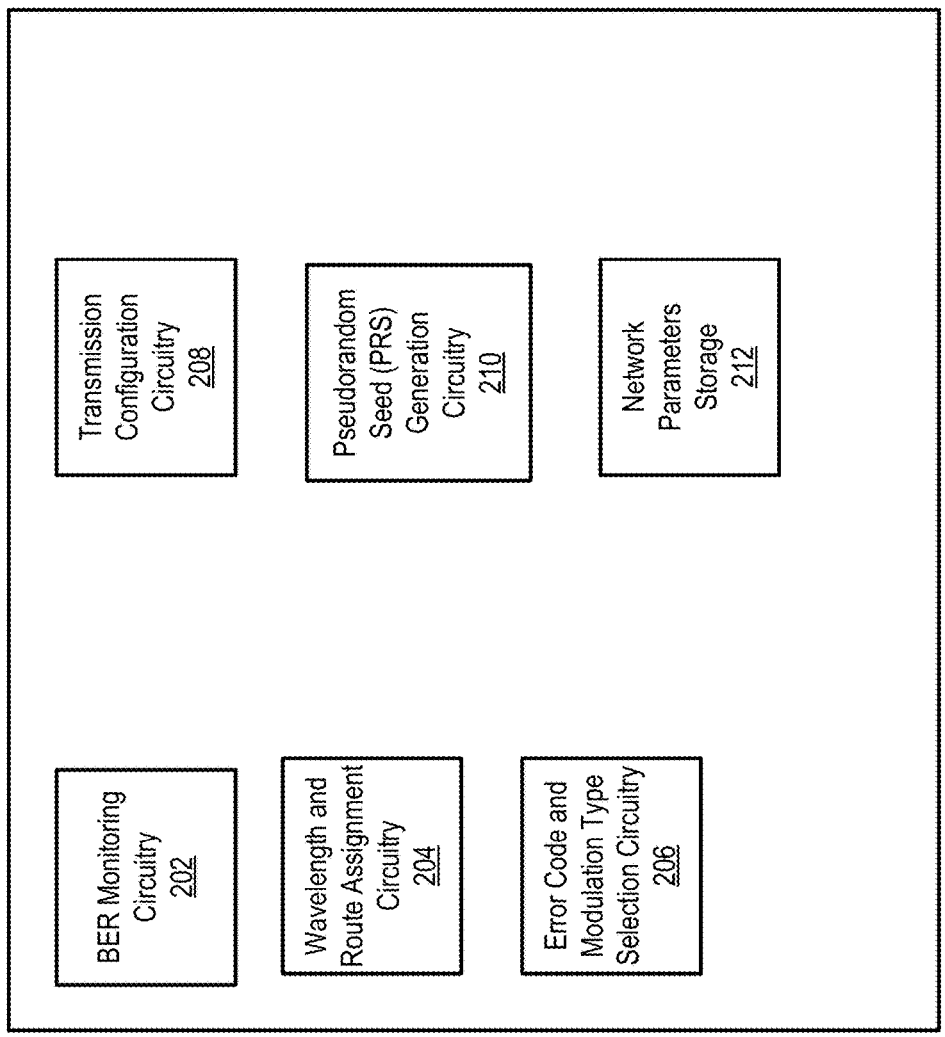
FIG. 2 illustrates software defined network (SD) controller circuitry according to one embodiment of the present disclosure.

FIG. 2 illustrates SDN controller circuitry 102' according to one embodiment of the present disclosure. With continued reference to FIG. 1, the SDN controller circuitry 102' includes bit error rate (BER) monitoring circuitry 202 generally configured to monitor a communications link between the RRHs and the BBU pool to determine if the BER on the channel has changed. The BER monitoring circuitry 202 is configured to monitor a BER of a given link on a frame-by-frame basis to determine if the BER has changed from a previous frame. For example, for a given link between the BBU pool and an RRH, during operation the BER associated with the link may improve or degrade (or stay the same) compared to a previous frame on that link. If the BER has changed in the next frame, the BER monitoring circuitry 202 may cause an adjustment to an error correction code (e.g., forward error correction (FEC)) to either increase a strength and/or iteration requirement of the error correction code or decrease a strength and/or iteration requirement of the error correction code.

The SDN controller circuitry 102' also includes wavelength and route assignment circuitry 204 generally configured to select a wavelength for a given communication link and determine an appropriate route to link the BBU pool to a target RRH. The wavelength and route assignment circuitry 204 is configured to control the BBU pool to assign a selected wavelength for a given link instance, and assign an output port of the BBU pool for the given link instance (to enable the AWG circuitry to steer the data traffic to an appropriate power splitter). The wavelength and route assignment circuitry 204 is also configured to control a tunable filter along the link path to filter out all wavelengths except the selected wavelength for the given link instance.

The SDN controller circuitry 102' also includes error code and modulation type selection circuitry 206 generally configured to select an error code (e.g., FEC, etc.) and modulation format (e.g., DD, CD, etc.) for a given link instance. Regarding error code selection, the error code and modulation type selection circuitry 206 may select an error code based on a priori knowledge of the limitations of a given link. The error code and modulation type selection circuitry 206 may also select an error code and/or select a strength and/or iteration requirement of an error code based on an indication from the BER monitoring circuitry 202 of changes in the BER for a given link instance, thus optimizing error correction for a given link. The RRHs in FIG. 1 can be located at different distances to the central office. In addition, each connection may experience a different noise level due to the random crosstalk terms developed, for example, in the AWG circuitry 112. Employing optimal error-correcting code rates (rather than provisioning for the worst-case transmission scenario) hence leads to variable net bit rates per the antenna site. Considering this variability and the different traffic requirements of small and macro cells, the present disclosure provides adaptive modulation and coding to maximize multiplexing gains and to optimize the performance of the MFH network on a per connection basis. Regarding the modulation type, the error code and modulation type selection circuitry 206 may select a CD and/or DD modulation format, based on the capabilities of an RRH associated with a given link, thus optimizing bandwidth for a given link.

The SDN controller circuitry 102' also includes pseudo-random seed (PRS) generation circuitry 210 generally configured to seed corresponding pseudorandom bit sequence generators (not shown in this drawing) associated with a BBU and RRH to enable generation of matching pseudo-random bit sequences (PRBS) in a BBU/RRH pair for a given link instance. The PRBSs are used to encode a preamble of a frame (in a downlink direction) or the frame (in an uplink direction), as will be described in greater detail below.

The SDN controller circuitry 102' also includes transmission configuration circuitry 208 generally configured to encode parameters of the physical layer onto a PRBS. the physical layer parameters for a fronthaul connection, including modulation type, forward error correction (FEC) code rate, and transmit power are selected by the SDN controller 102 and encoded into a PRBS that is unique to the connection.

The SDN controller circuitry 102' also includes network parameters storage 212 to store various operation and link-specific parameters concerning the network 100. Such parameters may include, for example, flow tables, preamble mappings, network resources, capabilities of the BBU pool and RRHs in the network, modulation formats, error correction code formats, control codes, etc.

The SDN controller circuitry 102' may be by implemented, for example, using extensions of conventional and/or proprietary programming protocols, for example, an OpenFlow protocol. Such extensions may enable programming of the BER monitoring circuitry 202, error code and modulation type selection circuitry 206, transmission configuration circuitry 208, wavelength and route assignment circuitry 204, etc. As described above, the wavelength and route assignment circuitry 204 controls the tunable hardware in the network 100 to enable connections between BBUs and RRHs. The BER monitoring circuitry 202 monitors pseudorandom streams (between a BBU/RRH pair) and compares them with expected noise-free streams to estimate the signal quality at different receiver sites in real time. Based on a reported BER value and the target post-correction code BER, the error code and modulation type selection circuitry 206 determines a proper modulation/code (as may be stored in a lookup table in the network parameters storage 212). The transmission configuration circuitry 208 encodes the physical layer parameters onto a PRBS.

Figure 3:
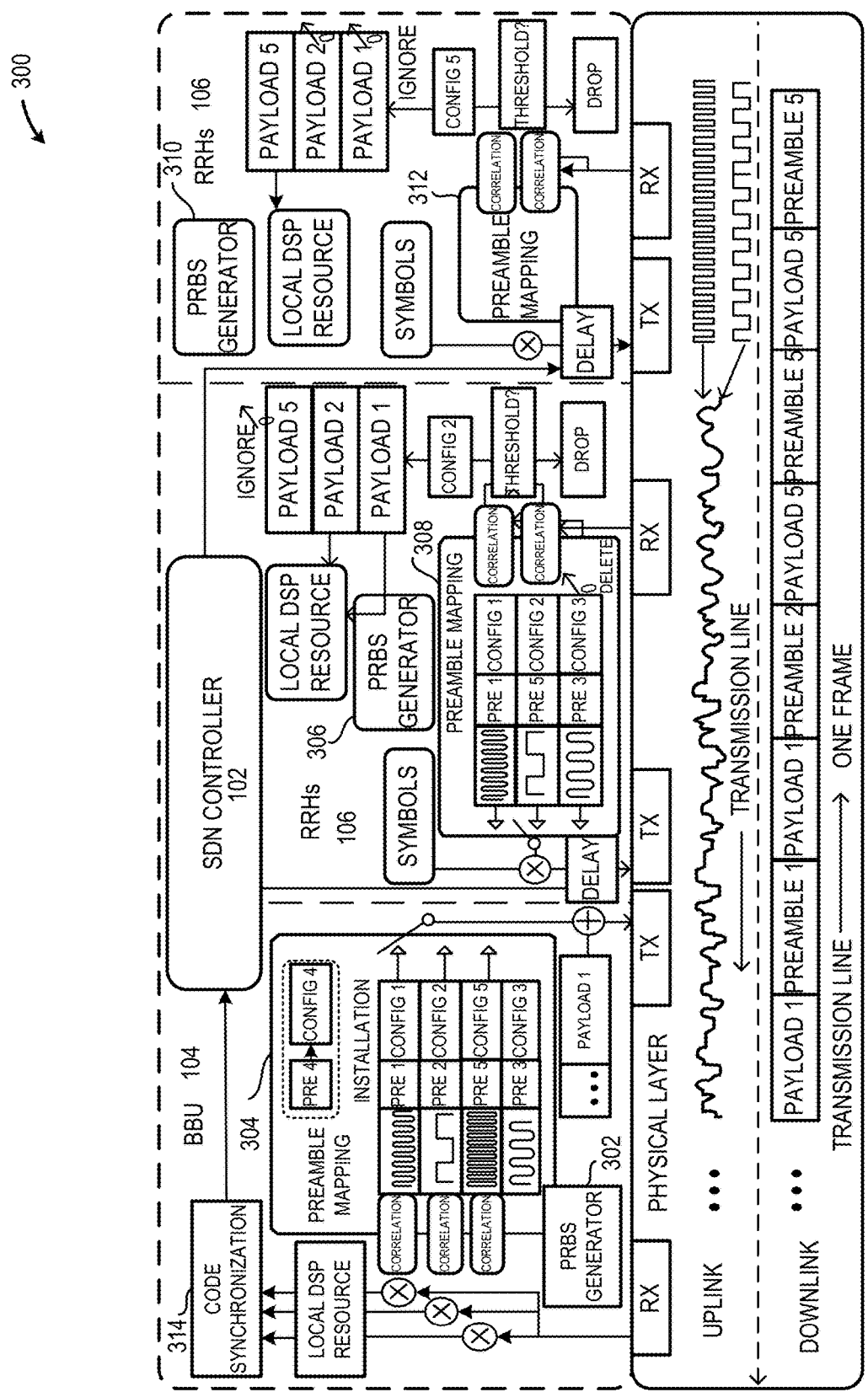
FIG. 3 illustrates pseudorandom encoding/decoding scenarios for both downlink and uplink transmission in a MFH network according to one embodiment of the present disclosure.

FIG. 3 illustrates pseudorandom encoding/decoding scenarios 300 for both downlink and uplink transmission in a MFH network according to one embodiment of the present disclosure. With continued reference to FIG. 1 and FIG. 2, the pseudorandom encoding/decoding illustrated in FIG. 3 provides details for preamble encoding for downlink and code division multiplexing for uplink transmission.

As described above, the physical layer parameters for a fronthaul connection, including modulation type, forward error correction (FEC) code rate, and transmit power are chosen by the SDN controller 102 and encoded into a pseudorandom bit sequence (PRBS) that is unique to the connection.

In a downlink transmission, the transfer of information between a BBU-RRH pair comprises a sequence of frames each with a payload and a pseudorandom preamble. To establish a downlink connection, the PRS generation circuitry 210 first initializes the random seeds at the BBU and the RRH to the same value and then instructs them to generate identical preambles. The mapping between the generated preambles and the existing channel configuration is stored in the SDN controller 102, the BBU, and the RRH. By evaluating a cross-correlation function on the received preambles, the RRH discovers the frames destined to it. Should a frame be processed at the destination RRH, the existing mapping between the preamble and the physical channel to determine which digital signal processing (DSP) algorithm, modulation type/order, and LDPC code should be employed for demodulating and decoding the frame. This secure preamble encoding technique also serves as a means for frame synchronization and the estimation of the pre-FEC bit error rate (BER) without the need for explicit optical performance monitoring hardware in the network.

To enable bidirectional adaptive transmission, the present disclosure utilizes synchronized code division multiplexing (CDM) protocols for communication in the uplink direction. Code division multiple access (CDMA) has been studied for performance improvements in optical access networks. Unlike downlink transmission in which the PRBS in the preamble carries the physical layer parameters, in the uplink, the PRBS encodes the entire data frame(s) and thus provides an addressing scheme along with the cyclic routing pattern of the AWG circuitry 112. As illustrated in FIG. 3, adaptive net bit rates in downlink are achieved through assigning variable frame numbers to different RRHs. The bandwidth allocation for uplink is achieved through CDM in the electrical domain within the RRHs.

In FIG. 3, BBU 104 and each of the RRHs 106 include PRES generator circuitry 302, 306, and 310, respectively. The PRBS generator circuitry 302, 306, and 310 generates a pseudorandom bit sequence based on a random seeding generated by PRS generation circuitry 210. The pseudorandom bit sequence is identical for each BBU-RRH pair, to enable the advantages and functionality described herein. Additionally, BBU 104 includes code synchronization circuitry 312 to provide uplink communications using, for example, code-division multiple access (CDMA). In CDMA, each multiplexed code is synchronized by the same clock. Thus, the code synchronization circuitry 312 is also configured to generate feedback information to a connect RRH to enable timing control of a synchronizing clock.

Additionally, BBU 104 and each of the RRHs 106 include preamble mapping circuitry 304, 308 and 312, respectively. Preamble mapping circuitry 304, 308 and 312 are each configured to map information between each preamble based on corresponding channel configuration data stored therein. A preamble is a real-time distributed sequence number, and, by using the same PRBS seed, the generated preamble at RRH and BBU (as controlled by the SDN controller 102) are identical. To discover a location of a corresponding preamble in a received signal, the preamble mapping circuitry 304, 308 and 312 are each configured to execute a correlation function. A correlation function may include, for example, C(s,t) corr(X(s), Y(t)). Based on the mapping, each BBU RRH pair can discover LDPC code type, modulation format, etc., related to the payload. Such configuration data may be controlled and defined by the SDN controller circuitry 102.

Modulation Formats for Hybrid Transmission

Due to the integration of heterogeneous resources and technologies in 5G (and beyond) systems, transmission in a hybrid MFH network with both CD and DD transceivers may present challenges. For the following example, assume a downlink multicast transmission using the MFH network 100 described above in reference to FIGS. 1-3. With multicast traffic delivery, one BBU disseminates the same information copy simultaneously to more than one RRH. Such a point-to-multipoint communication pattern can exist in the fronthaul network 100, for example, when the same portion of data needs to be sent to different RRHs in a joint transmission scheme (e.g., CoMP).

From a physical layer point of view, three transmission scenarios are described below. The first transmission scenario involves traffic delivery from the BBU pool to a group of type 1 RRHs (i.e., CD nodes). The second scenario involves type 2 RRHs (i.e., DD nodes). Finally, in a hybrid transmission scenario, a BBU communicates with RRHs of different types. The RRHs that employ CD are capable of detecting both phase modulated (PM) and intensity modulated (IM) signals, whereas DD RRHs disregard any information in the phase of the received signals. With binary modulation formats (i.e., on-off keying (OOK) and BPSK), BPSK can only be used for communication with Type 1 RRHs and OOK can be used for Type 2 RRHs.

In the MFH network of FIG. 1, a transmission challenge arises in the case of hybrid multicasting since a modulation scheme may only be suitable for a given type of receiver. Transmitting the same information using BPSK (to Type 1 RRHs within the set of recipients) and OOK (to Type 2 RRHs) in consecutive time slots is one solution. However, this solution may increase the delays and may result in low network utilization. Using OOK to simultaneously transmit to Type 1 and Type 2 RRHs is a second solution, since coherent detectors can extract the amplitude information as well. However, this second solution does not make use of the phase content at Type 1 RRHs and may therefore result in a low spectral efficiency at higher modulation orders.

Accordingly, to reduce or eliminate the challenges noted above, the present disclosure provides probabilistically coded, non-uniform modulation formats for hybrid transmission as well as consolidated encoding and decoding algorithms in different terminals.

FIG. 4 illustrates a summary chart 400 of improved PAM-3 and QAM-5 modulation formats to achieve optimal spectral efficiency according to one embodiment of the present disclosure. In the summary chart of FIG. 4, conventional modulation formats are compared to improved PAM-3 modulation format in column 402, and to the improved QAM-5 modulation format in column 404.

The constellation diagrams with lines indicating transition among various symbols are depicted in the second row. The third and fourth rows respectively illustrate the recovered symbols at Type 2 RRH (using DD) and at Type 1 RRH (using CD). The conventional (normal) PAM-3 constellation diagram contains the positive phase point with amplitude 1, the negative phase point with amplitude −1, and the central point with amplitude 0. The transmitted binary information is represented by the amplitude while the phase of the Normal PAM-3 signal can be assigned randomly or in a round-robin fashion. Either way, the phase of a Normal PAM-3 signal does not carry information.

Consider the example of the DD of a Normal PAM-3 signal in FIG. 4. At a type 2 (DD) RRH, the two points with amplitude 1 and −1 will both be detected as 1 and the point with amplitude 0 will be detected as 0. Nevertheless, at a type 1 RRH (i.e., Normal PAM-3 signal being received by a coherent detector), both amplitude and phase information can be detected. In contrast, the improved probabilistically coded PAM-3 described herein encodes a phase of a symbol based on its neighboring symbol levels, and thus, more information can be delivered to a Type 1 RRH. In one embodiment, the phase may be encoded for all symbols with amplitude 1, since only these symbols carry the phase information. However, it may not be desirable to encode all symbols with their phase since as they may be affected by the transient noise at a type 2 RRH.

As illustrated in FIG. 4, the inventors herein have experimentally observed that a Normal PAM-3 signal generated by the phase modulator is impaired by the imbalanced noise and the transient noise at the DD stage. The imbalanced noise is due to the amplitude inequality between the positive and negative phase points and can be significantly suppressed by setting the correct bias voltage in the phase modulator. On the other hand, the transient noise arises because of the direct transitions between opposite phases. Using return-to-zero (RZ) instead of non-return-to-zero (NRZ) PAM-3 is a potential solution, however, this requires higher sampling rate in both the digital-to-analog converter (DAC) and analog-to-digital converter (ADC). Therefore, in another embodiment the phase information is encoded probabilistically to reduce or eliminate the transient noise.

The improved PAM-3 encoding of this embodiment is to encode the PAM-3 signals based on three rules: (1) if the current symbol's amplitude is zero, no phase information is encoded; (2) if both of the current symbol's amplitude and the previous symbol's amplitude are one, the current symbol's phase will follow the previous symbol's phase value; and (3) if the current symbol's magnitude is one and the previous symbol's magnitude is zero, the current symbol's phase will depend on the one before the previous symbol's amplitude. As depicted in FIG. 4, the shaped (improved) PAM-3 signal reduces or eliminates the transient effects between positive and negative phases.

The Normal QAM-5 constellation diagram contains four symmetric points at inphase and quadrature component with amplitude 1, and the central point with amplitude 0. The amplitude of the signal carries all the information while the randomly assigned or round-robin assigned phase provides no extra information. Thus, for normal QAM-5 the amplitude has to carry the complete information if we want the type 2 (DD) RRH and type 1 (CD) RRH in FIG. 4 to receive the same information.

Let us consider the example of the DD of a Normal QAM-5 signal in FIG. 4. At a type 2 (DD) RRH, the two points with amplitude 1 and 1 will both be detected as 1 and the point with amplitude 0 will be detected as 0. Nevertheless, at a type 1 RRH (i.e., Normal QAM-5 signal being received by a coherent detector), both amplitude and phase information can be detected. In contrast, the present disclosure provide a probabilistically coded QAM-5 by encoding the phase of a symbol based on its neighboring symbol levels, and thus, more information for LDPC code can be delivered to a type 1 RRH. The most straightforward idea is to encode the phase of all symbols with amplitude 1 since only these symbols carry the phase information. However, it may not desirable to encode all symbols with their phase since they may be affected by the transient noise at a type 2 RRH.

As illustrated in FIG. 4, the inventors herein have experimentally observed that a Normal QAM-5 signal generated by the phase modulator is impaired by the imbalanced noise and the transient noise at the DD stage. The imbalanced noise is due to the amplitude inequality between the positive and negative phase points and can be significantly suppressed by setting the correct bias voltage in the phase modulator. On the other hand, the transient noise arises because of the direct transitions between opposite phases. Accordingly, the improved QAM-5 according to the teachings herein encodes the phase information probabilistically to reduce or eliminate the transient noise.

In one embodiment, the improved QAM-5 format is provided by encoding the QAM-5 signals based on four rules: (1) if the current symbol's amplitude is zero, no phase information is encoded; (2) if both of the current symbol's amplitude and the previous symbol's amplitude are one, the current symbol's phase will follow the previous symbol's phase value; and (3) if the current symbol's magnitude is one and the previous symbol's magnitude is zero, the current symbol's phase will depend on the one before the previous symbol's amplitude. (4) if the current symbol's order is even, the current symbol will rotate to the imaginary axis. The odd ordered symbol will stay at the real axis. As depicted in FIG. 4, the shaped (improved) QAM-5 signal does not suffer from the transient effects between positive and negative phases. Just like the QPSK is generally considered more durable than the BPSK. Compared to the PAM-3, by fully utilizing the I-Q component, the improved QAM-5 is more durable for the phase noise during the transmission.

With continued reference to FIGS. 1-4, pseudocode for the improved PAM-3 and improved QAM-5 modulation formats are provided below:

A: Improved PAM-3 Encoding and Decoding

```
PAM-3 Encoder:
Input: M indicates the input binary information bits of length n.
Output: L indicates the output phase-improved PAM-3 values of size n.
for i = 0, 1, 2, 3, 4, ..., n-1
    if i > 1:
L[i] = M[i]
else:
if M[i-1] == 1:
L[i] = L[i-1]
else:
L[i] = 1-2*M[i-2]
```

For the improved PAM-3 modulation format, the current output symbol L[i] will not carry any phase information and will be encoded as 0 when current input M[i] is 0. L[i] will not carry any phase information either and will take the value of the previous output symbol L[i-1] if the previous input symbol M[i] is 1. Otherwise, L[i] will carry the phase information, and it will be +1 when input symbol M[i-2] is 0, and −1 when M[i-2] is 1.

```
PAM-3 Decoder:
Input: Y is the received symbol value, sigma is the received SNR,
    ImpactRatio is a
parameter to show to what degree the phase improved information
affects the output LLR.
    Output: LLR indicates the output log-likelihood ratio
    (LLR) for the following min-sum algorithm.
    for i = 0, 1, 2, 3, ..., n:
LLR1st[i] = calOOKLLR(Y[i]**2)
    for i = 0, 1, 2, 3, ..., n:
        if i==0:
            LLR3rd[i] = 0
            PrPhaseUse[i] = 0
        else:
            LLR3rd[i] = calPhaseImprovedLLR(Y[i-2])
            PrPhaseUse[i] = calPhaseUseProbability(Y[i-2],
                Y[i-1])
    for i = 0, 1, 2, 3, ..., n:
        LLR[i] =
            LLR1st[i]+ImpactRatio*PrPhaseUse[i]*LLR3rd[i]
    def calPhaseImprovedLLR(y):
        L31 = -0.5*(y-1)**2/(2*sigma**2)
        L30 = -0.5*(y+1)**2/(2*sigma**2)
        thirdllr = L31-L30
        return thirdllr
    def calPhaseUseProbability(y1, y2):
        const = 1/sqrt(2*pi*sigma)
        p0 = const*exp(-0.5*(y2)**2/sigma**2)
        p1 = const*exp(-0.5*(y1-1)**2/sigma**2)
        n1 = const*exp(-0.5*(y1+1)**2/sigma**2)
        thirdllrP = p0*(p1+n0)
    return thirdllrP
```

For the PAM-3 decoder, function calOOKLLR( ) determines a standard log-likelihood ratio based on the modulus of the input symbols. The output of calOOKLLR( ) is stored invariable LLR1st. Based on the phase information from the input symbols, function calPhaseImprovedLLR( ) determines the conditional LLR provided that each received symbol carries the phase improved information. The output of calPhaseImprovedLLR( ) is stored in variable LLR3rd. LLR3rd[i] indicates the LLR of L[i-2]. Since LLR3rd is determined conditionally, the function called calPhaseUseProbability( ) determines if the probability that this condition is true (and the results are stored in variable PrPhaseUse). For this condition to be true, the previous symbols M[i-1] and M[i-2] are identified as 0 and 1, respectively.

B. QAM-5 Encoding and Decoding

```
QAM-5 Encoder:
Input: M indicates the input binary information bits of length n.
Output: L is the output phase improved QAM-5 values and has a length
equal to n.
L = -M
L[1:] * = sign(L[:-1]+0.5)
L[2k] * = 1 j, k = 0, 1, 2, 3, ....
```

For the improved QAM-5 modulation format, the current output symbol L[i] will not carry any phase information and will be encoded as 0 when current input M[i] is 0. Otherwise, L[i] will carry the phase information, which will be −1 if the previous input symbol M[i] is 1, and +1 otherwise. At the end, the evenly indexed terms L[2k] will be converted into imaginary numbers, while oddly ordered terms L[2k+1] will be interpreted as real numbers.

```
QAM-5 Decoder:
Input: Y indicates the received symbol value, sigma indicates
    the received SNR,
ImpactRatio indicates to what extent the phase improved information
affects the output LLR.
    Output: LLR indicates the output log-likelihood ratio for the
    following min-sum
algorithm.
    for i = 0, 1, 2, 3, ..., n:
        LLR1st[i] = calOOKLLR(Y[i]** 2)
    for i = 0, 1, 2, 3, ..., n:
        if i == 0:
            LLR2nd[i] = 0
            PrPhaseUse[i] = 0
        else:
            LLR2nd[i] = calPhaseImprovedLLR(Y[i-2])
            PrPhaseUse[i] = calPhaseUseProbability(Y[i-2], Y[i-1])
    for i = 0, 1, 2, 3, ..., n:
        LLR[i] = LLR1st[i]
        +ImpactRatio PrPhaseUse[i] LLR2nd[i]
        def calPhaseImprovedLLR(y):
            L31 = -0.5* (y-1) **2/(2* sigma** 2)
            L30 = -0.5* (y+1)** 2/(2* sigma **2)
            thirdllr = L31-L30
            return thirdllr
        def calPhaseUseProbability(y1, y2):
            const = 1/sqrt(2* pi *sigma)
            p0 = const*exp(-0.5*(y2)** 2/sigma** 2)
            thirdllrP = 1-p0
            return thirdllrP
```

The logic of the improved QAM-5 decoding routine is similar to that of the PAM-3 decoding scheme described above. However, the approach of determining the phase improved LLR and the probability of carrying the phase information is updated based on the above-described encoding algorithm.

Figure 5:
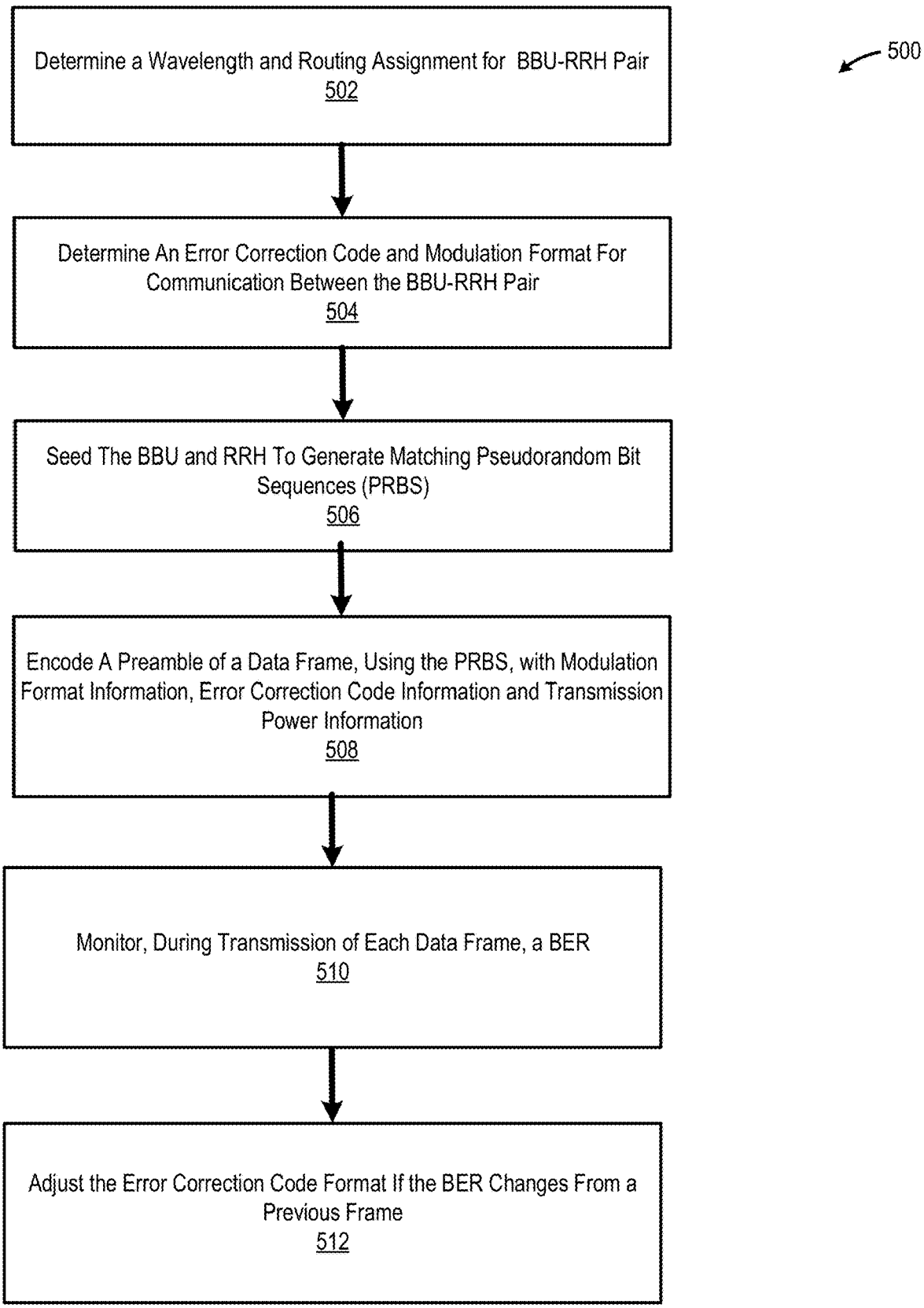
FIG. 5 is a flowchart of MFH network operations according to one embodiment of the present disclosure.

FIG. 5 illustrates a flowchart 500 of MFH network operations according to one embodiment of the present disclosure. With continued reference to FIGS. 1-4 (described above), operations of this embodiment include determining and routing assignment for a BBU-RRH pair 502. Operations also include determining an error code and modulation format for communication between the BBU-RRH pair 504. Operations of this embodiment also include seeding a BBU and RRH with a pseudorandom seed to generate matching pseudorandom bit sequences (PRBS) 506. Operations also include encoding a preamble of a data frame, using the PRBS, with modulation format information, error correction code information, and transmission power information 508. Operations of this embodiment also includes monitoring, during transmission of each data frame, a bit error rate (BER) 510. Operations also include adjusting the error code format if the BER has changed from a previous frame 215.

Figure 6:
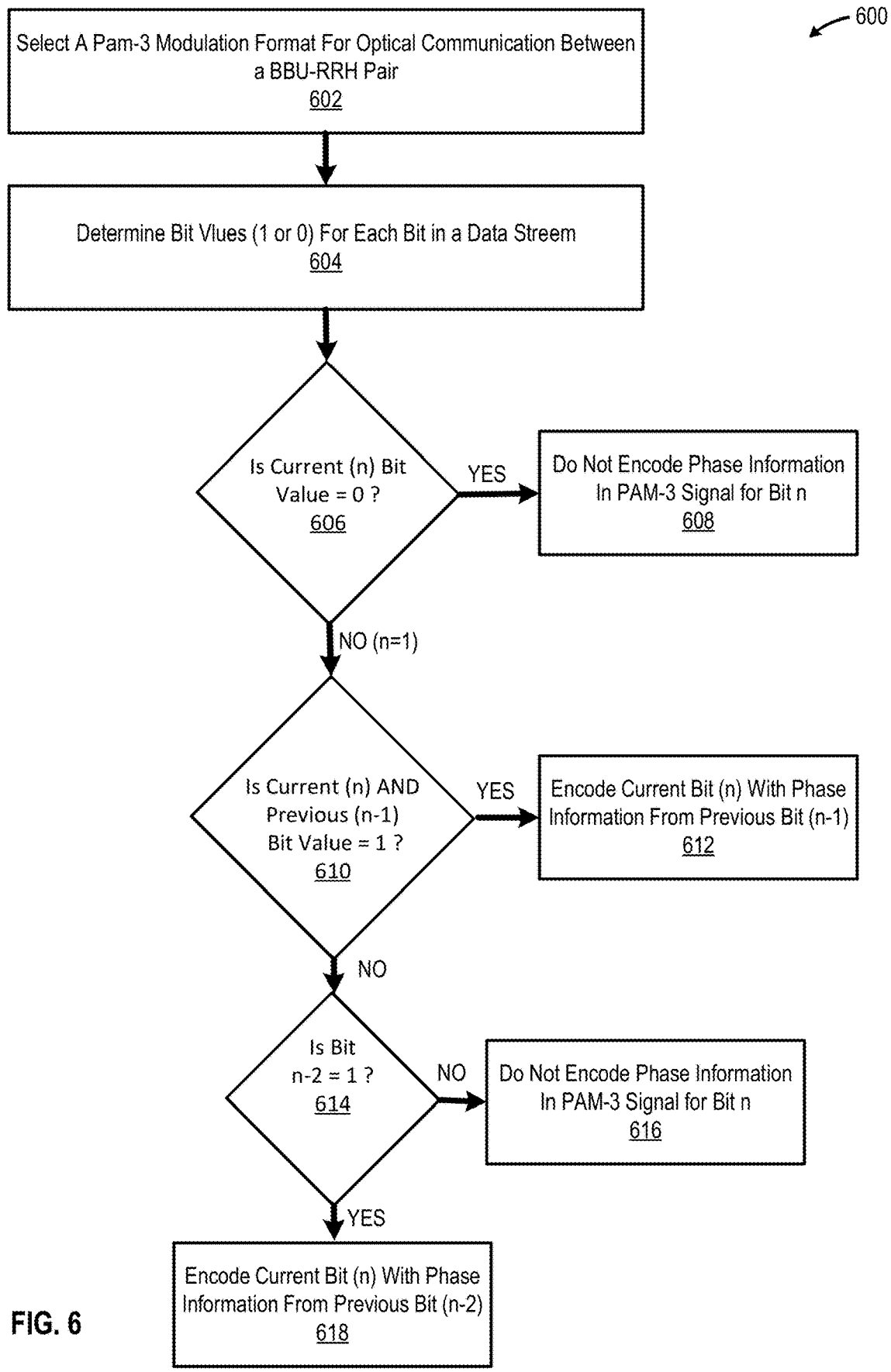
FIG. 6 is a flowchart of encoding a PAM-3 modulation format according to one embodiment of the present disclosure.

FIG. 6 is a flowchart of encoding a PAM-3 modulation format according to one embodiment of the present disclosure. With continued reference to FIGS. 1-5 (described above), operations of this embodiment include selecting a PAM-3 modulation format for optical communications between a BBU-RRH pair 602. Operations also include determining bit values (1 or 0) for each bit in a data stream 604. Operations also include determining if the current (n) bit value is 0 606. If the current bit value is 0, operations also include excluding phase encoding information for the current bit (n) 608. If the current bit value is 1, operations also include determining if the current bit value and a previous bit value (n−1) both equal 1 (610). If the current bit value and the previous bit value are both 1, operations also include encoding the current bit with phase information from the previous bit (n−1) 612. If the current bit value is 1 and the previous bit value 0, operations also include determining if bit n−2 is equal to 1 (614). If bit n−2 is 0, operations include excluding phase encoding information for the current bit (N) 616. If bit n−2 is 1, operations include encoding the current bit with phase information from the n−2 bit 618.

Figure 7:
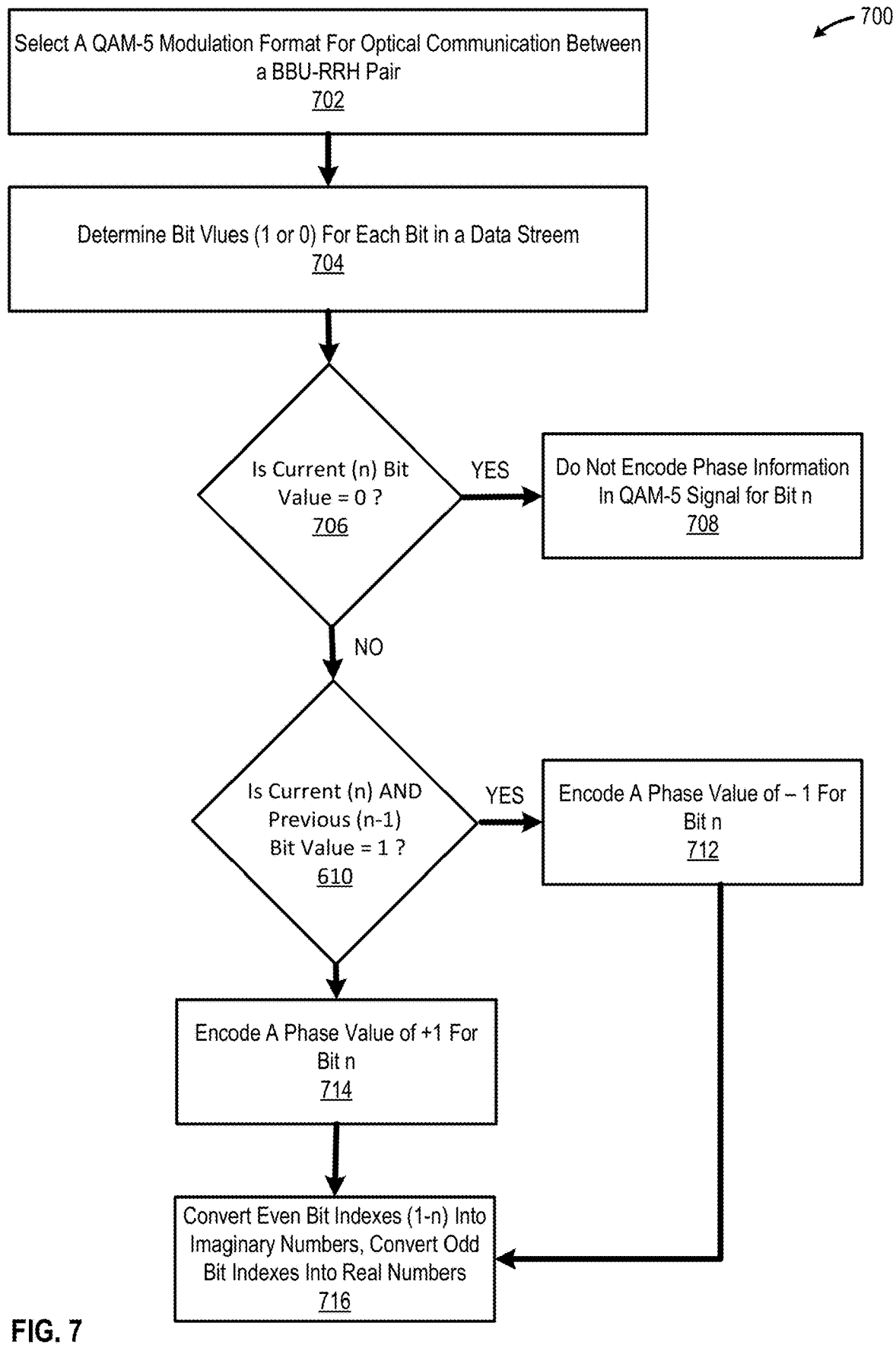
FIG. 7 is a flowchart of encoding a QAM-5 modulation format according to one embodiment of the present disclosure.

FIG. 7 is a flowchart of encoding a QAM-5 modulation format according to one embodiment of the present disclosure. With continued reference to FIGS. 1-5 (described above), operations of this embodiment include selecting a QAM-5 modulation format for optical communications between a BBU-RRH pair 702. Operations also include determining bit values (1 or 0) for each bit in a data stream 704. Operations also include determining if the current (n) bit value is 0 706. If the current bit value is 0, operations also include excluding phase encoding information for the current bit (n) 708. If the current bit value is 1, operations also include determining if the current bit value and a previous bit value (n−1) both equal 1 (710). If the current bit value and the previous bit value are both 1, operations also include encoding the current bit with a phase value of −1 (712). If the current bit value is 1 and the previous bit value 0, operations also include encoding the current bit with a phase value of +1 (714). Operations of this embodiment also including converting even bit indexes (among bits 1-n) into imaginary numbers, and converting off bit indexes into real numbers 716.

While FIGS. 5-7 illustrate various operations according to one or more embodiments, it is to be understood that not all of the operations depicted in FIGS. 5-7 are necessary for other embodiments. Indeed, it is fully contemplated herein that in other embodiments of the present disclosure, the operations depicted in FIG. 5-7, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Experimental Results—Downlink Transmission Performance

Figure 8:
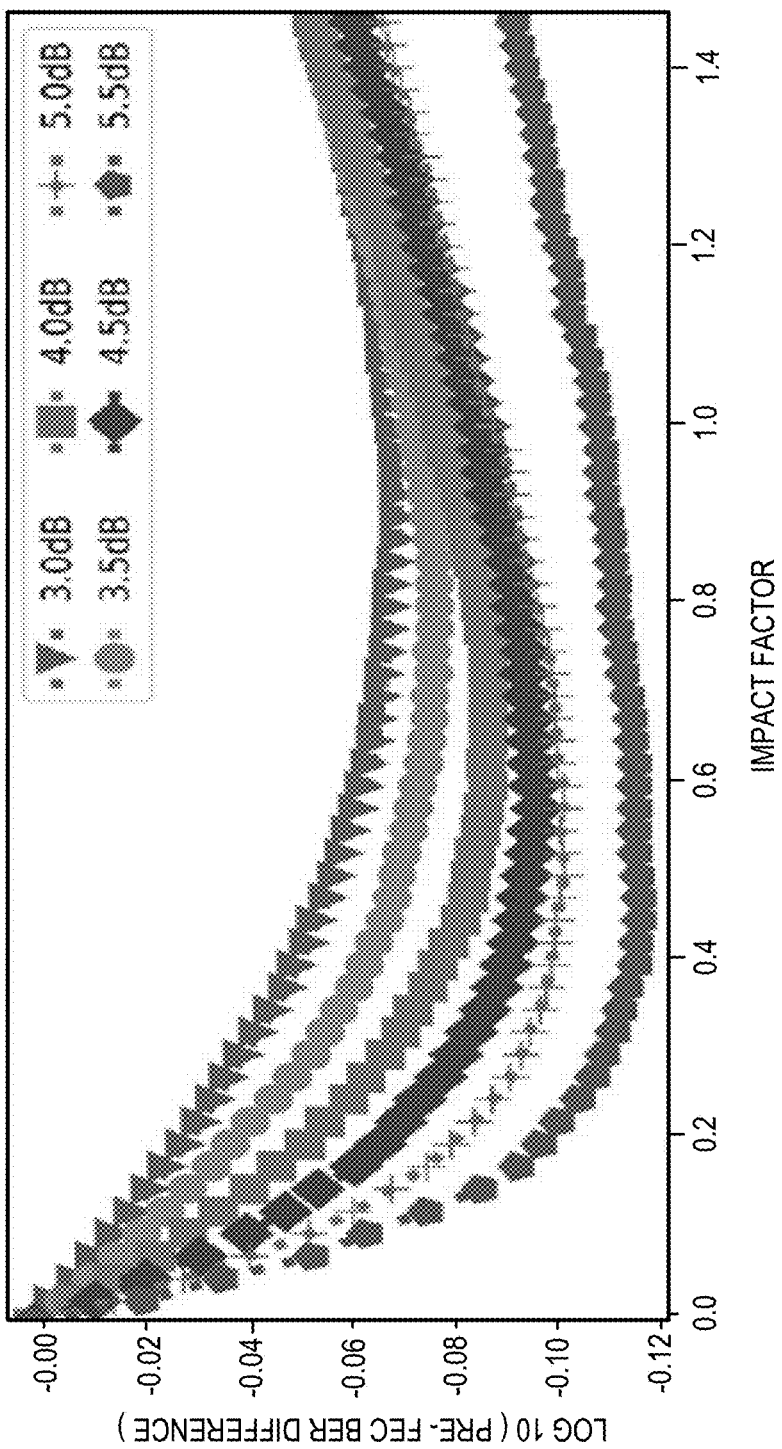
FIGS. 8 and 9, respectively, depict PAM-3 and QAM-5 pre-FEC BER versus impact ratio.
Figure 9:
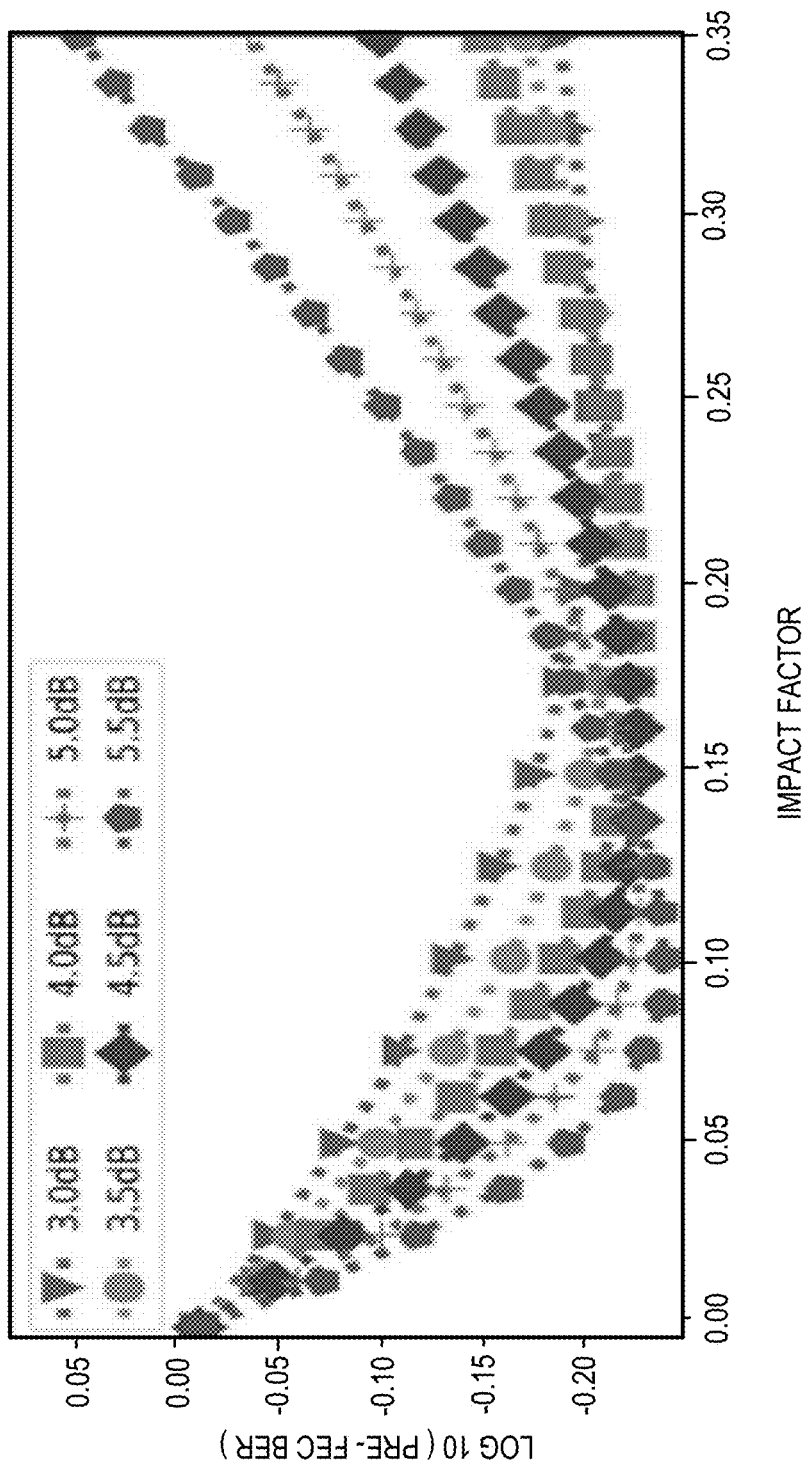

The inventors herein (also referred to as "we" and "our") define impact ratio as a metric to quantify the belief information (reliability) we can extract from the phase information in the proposed modulation formats. An impact ratio of 0 corresponds to the case without any performance improvement. To determine the optimal value of the impact ratio, we implemented PAM-3 and QAM-5 encoding and decoding algorithms as described above and simulated the transmission performance considering an additive white Gaussian noise (AWGN) channel, which corresponds to an amplified spontaneous emission (ASE) noise dominated scenario. FIGS. 8 and 9, respectively, depict PAM-3 and QAM-5 pre-FEC BER versus impact ratio (varied between 0 and a maximum value of 1.5) for different signal-to-noise ratios (SNRs). The reported values in FIGS. 8 and 9 have been normalized to the BER corresponding to the impact ratio of 0, since the value of this initial point is variable under different SNRs. Our simulation results suggest that the optimal value of the impact ratio depends on the SNR.

For instance, the optimal value of the impact ratio for PAM-3 is around 1 for SNR=3 dB and reduces to 0.5 for SNR=5.5 dB. According to FIG. 9, the optimal impact ratio for QAM-5 is equal to 0.27 for SNR=3 dB and 0.09 for SNR=5.5 dB.

The LDPC codes that we employ in this work operate under SNR values around 4 to 5 dB. Hence, we study the pre-FEC BER performance over this SNR range with fixed impact ratios. Our three quasi-cyclic LDPC codes (n, k, R, g) are constructed based on permutation matrices, where n, k, R, and g respectively denote the codeword length, information word length, code rate, and the girth of the corresponding bipartite graph representation of the parity-check matrix. We consider three codes, namely, code 1: (16935, 13550, 0.8, 8), code 2: (23110, 16179, 0.7, 10) and code 3: (18488, 11557, 0.625, 10).

Figure 10:
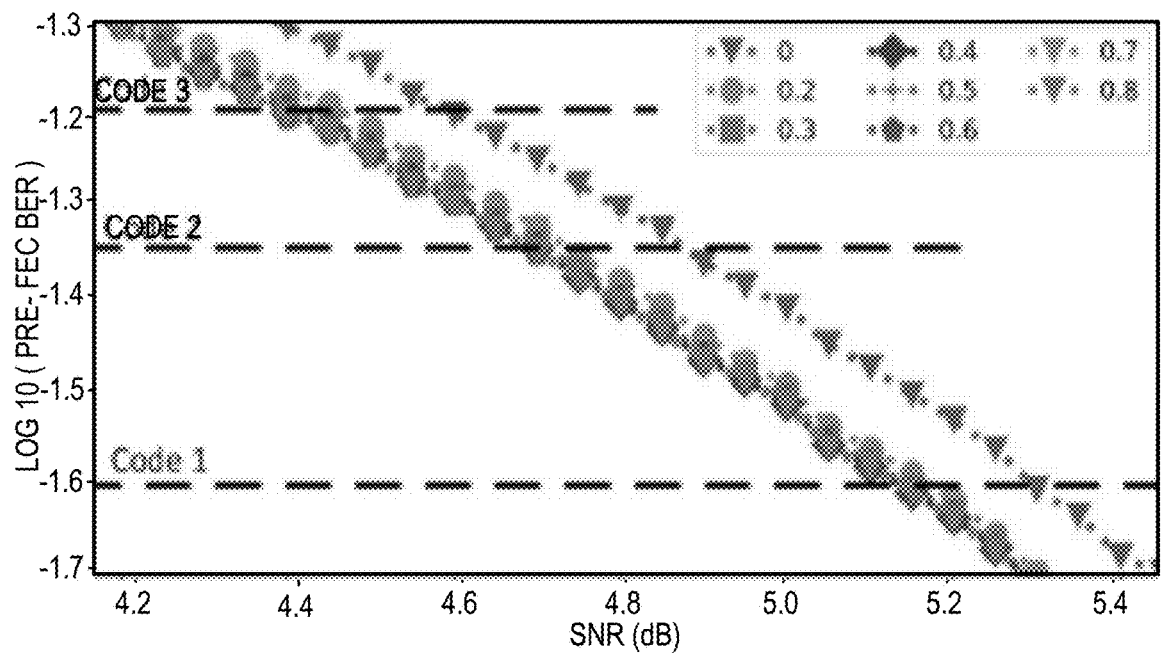
FIG. 10 depicts PAM-3 pre-FEC BER versus SNR for values of the impact ratio between 0 and 0.8.
Figure 11:
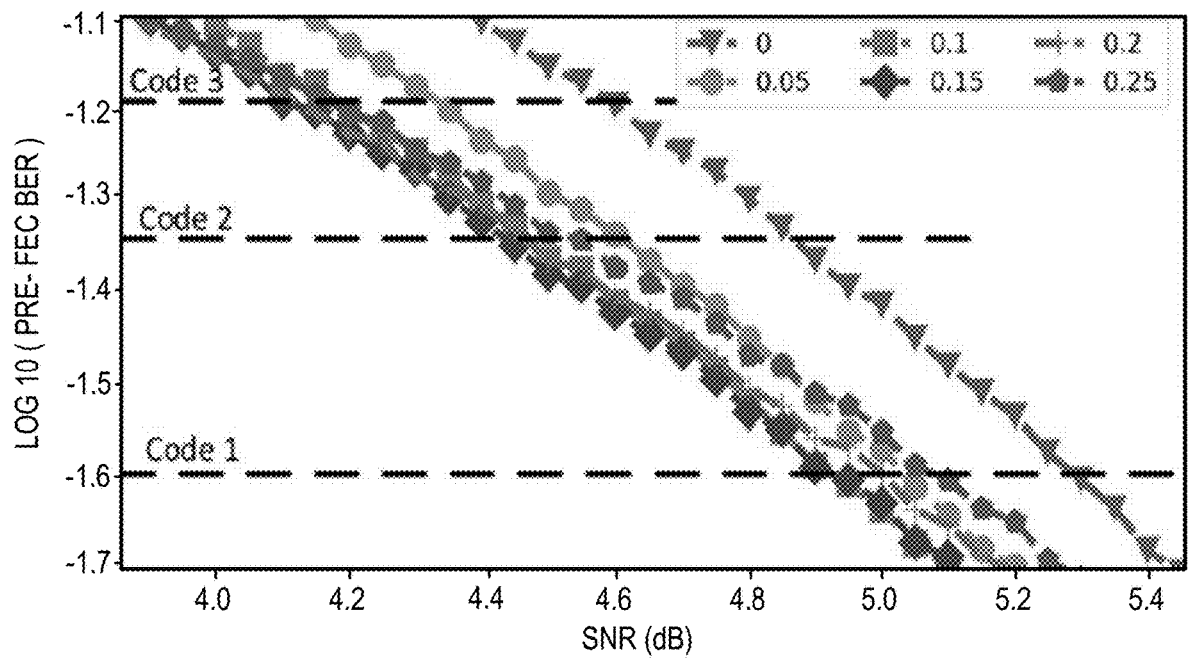
FIG. 11 illustrates the simulation results for QAM-5 with impact ratios between 0 and 0.25.
Figure 12:
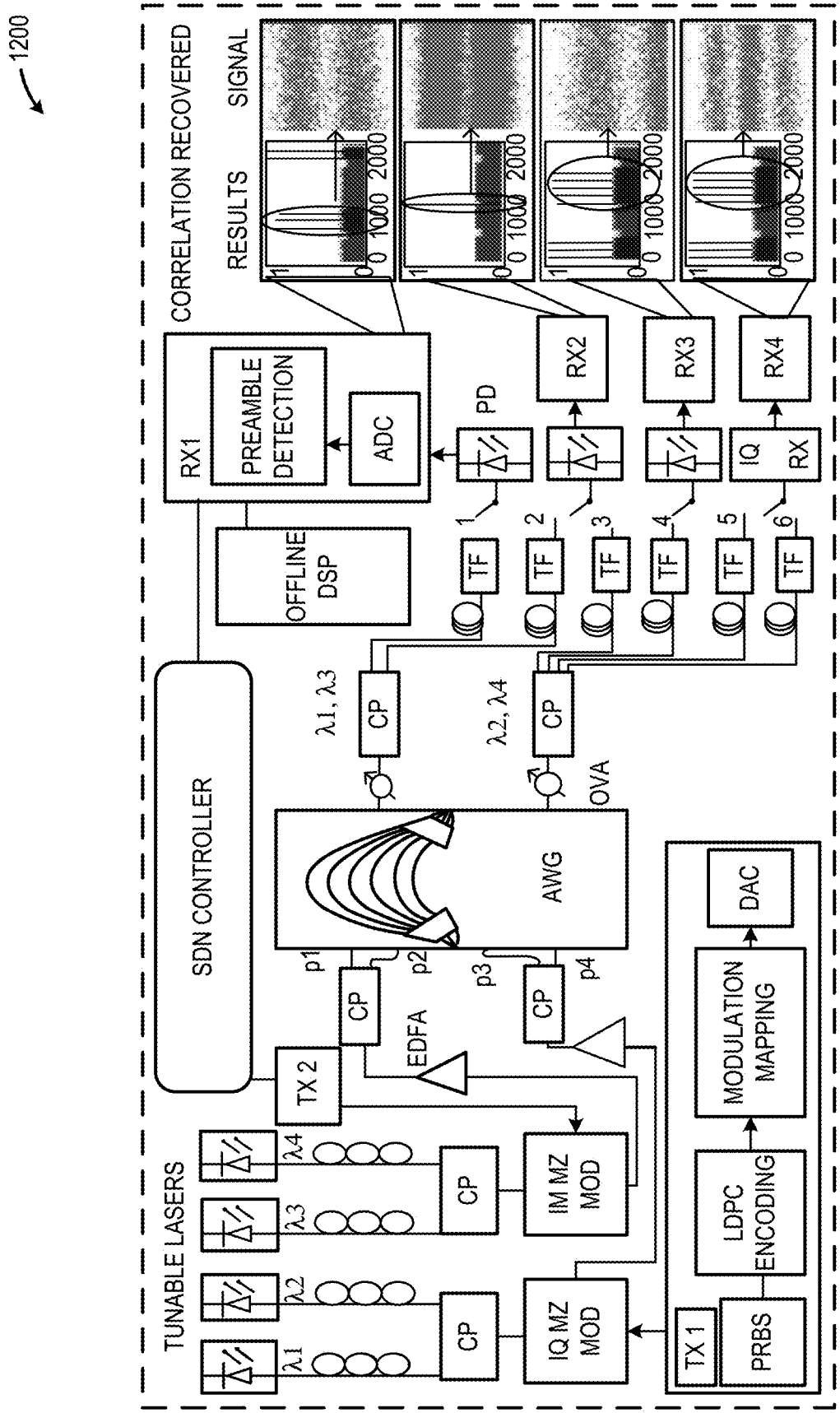
FIG. 12 illustrates an example downlink testbed, where the transmission distance between the central office and the antenna sites are emulated by variable optical attenuators (VOAs)

FIG. 10 illustrates PAM-3 pre-FEC BER versus SNR for values of the impact ratio between 0 and 0.8. On the other hand, FIG. 11 illustrates the simulation results for QAM-5 with impact ratios between 0 and 0.25. The pre-FEC BER threshold of the LDPC codes under study are also included. According to FIG. 11, while the impact ratio of 0.1 results in the best performance with code 1, it performs poorly with codes 2 and 3. The same argument applies to an impact ratio of 0.2. It is the best choice with code 3 and the poorest choice with code 1.

Considering these performance trends based on the existing codes and impact ratios, we pick an impact ratio of 0.6 for PAM-3 and 0.15 for QAM-5 in our experimental analysis.

Downlink Experimental Testbed Results

By choosing the appropriate impact ratios through simulations, we experimentally verify the performance of PAM-3 and QAM-5 transmission in a wavelength-routing MFH testbed. Four 10 kHz-linewidth, continuous-wave, tunable sources (with central frequencies f1=193.40 THz, f2=193.30 THz, f3=193.35 THz, and f4=193.20 THz) are combined two by two and applied to two Mach-Zehnder modulators. The binary data sequence is adaptively encoded with code 1, code 2, and code 3. We employ three direct detectors and one dual polarization (DP)-IQ coherent detector at four RRH locations. A broadcast signal is simultaneously detected by these receivers. Depending on the receiver type (i.e., CD and DD), the targeted frames are extracted through preamble decoding, which operates based on the mappings implemented by the SDN controller.

Figure 13:
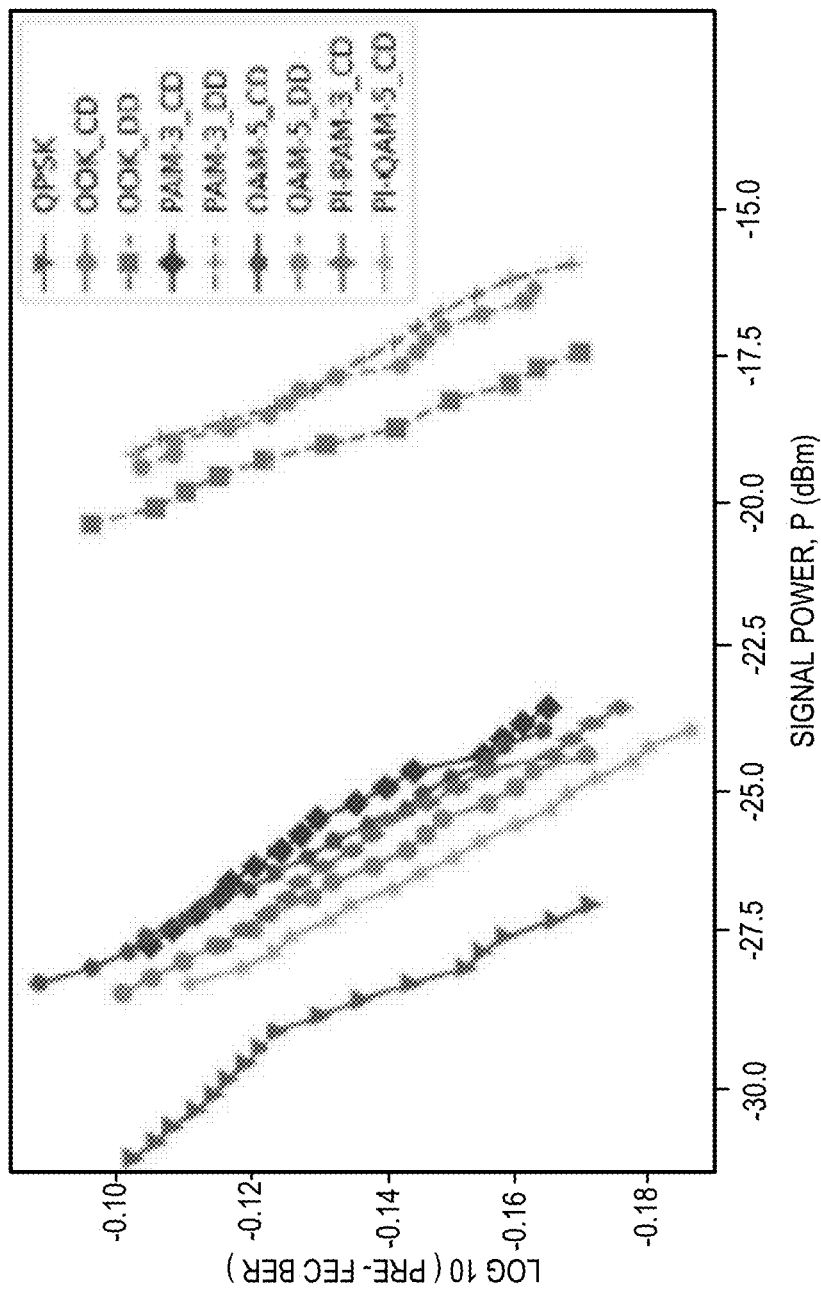
FIG. 13 illustrates experimental results on the pre-FEC BER performance of various modulation formats.

FIG. 13 illustrates experimental results on the pre-FEC BER performance of various modulation formats. The results indicate that QPSK is by far the best performing choice in our wavelength-routing testbed. It has good spectral efficiency and is also highly resilient to impairments. Hence, it can be used to connect distant radio heads to the central office. However, the downside of QPSK is that it can only be used at type 1 RRHs and not for hybrid multicasting. As expected, CD outperforms DD for modulation formats that can be used for hybrid transmission (i.e., OOK, PAM-3, and QAM-5). As illustrated in the figure, OOK outperforms PAM-3 and QAM-5 with DD, which is primarily due the imbalanced noise contained in the latter modulation formats. With CD, the performance gains of phase-improved PAM-3 and QAM-5 transmission become clear.

Figure 14:
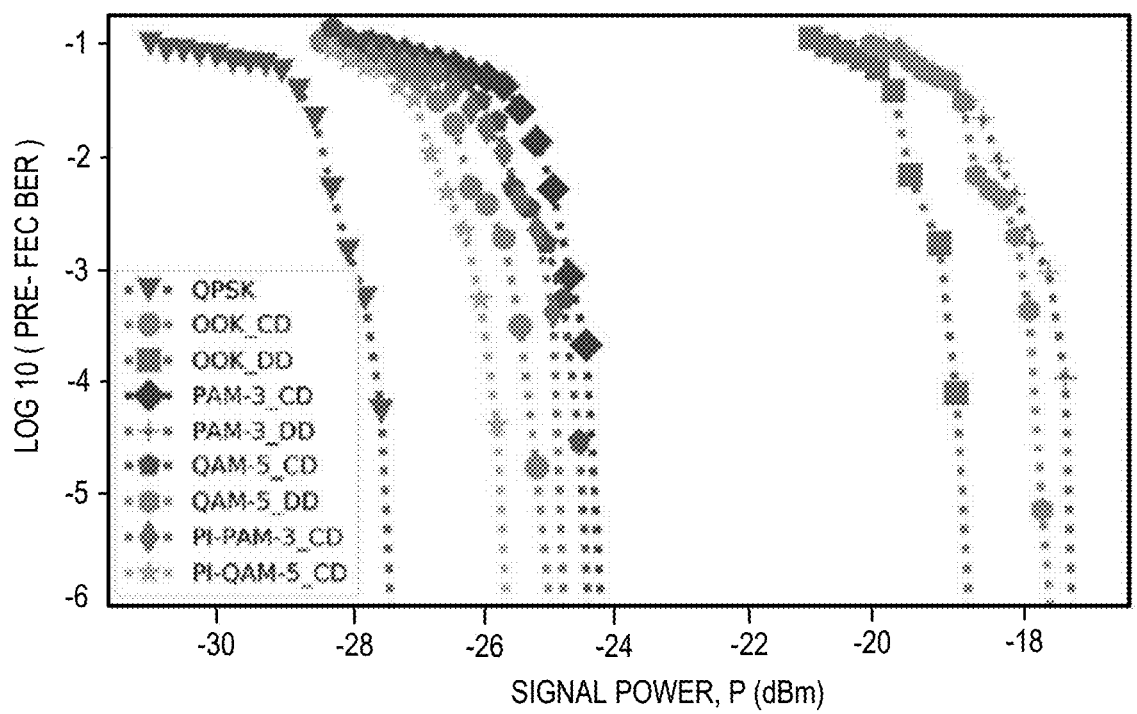
FIGS. 14-16 illustrate post-FEC BER versus received signal power for codes 1, 2, and 3, respectively.
Figure 15:
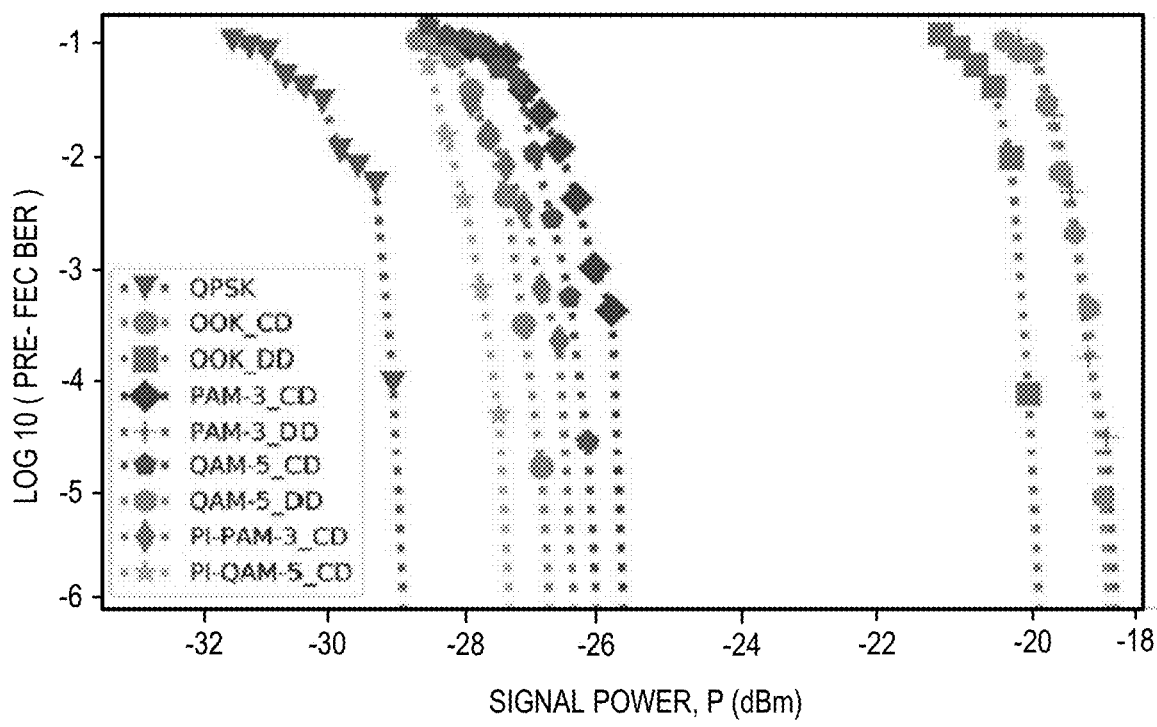
Figure 16:
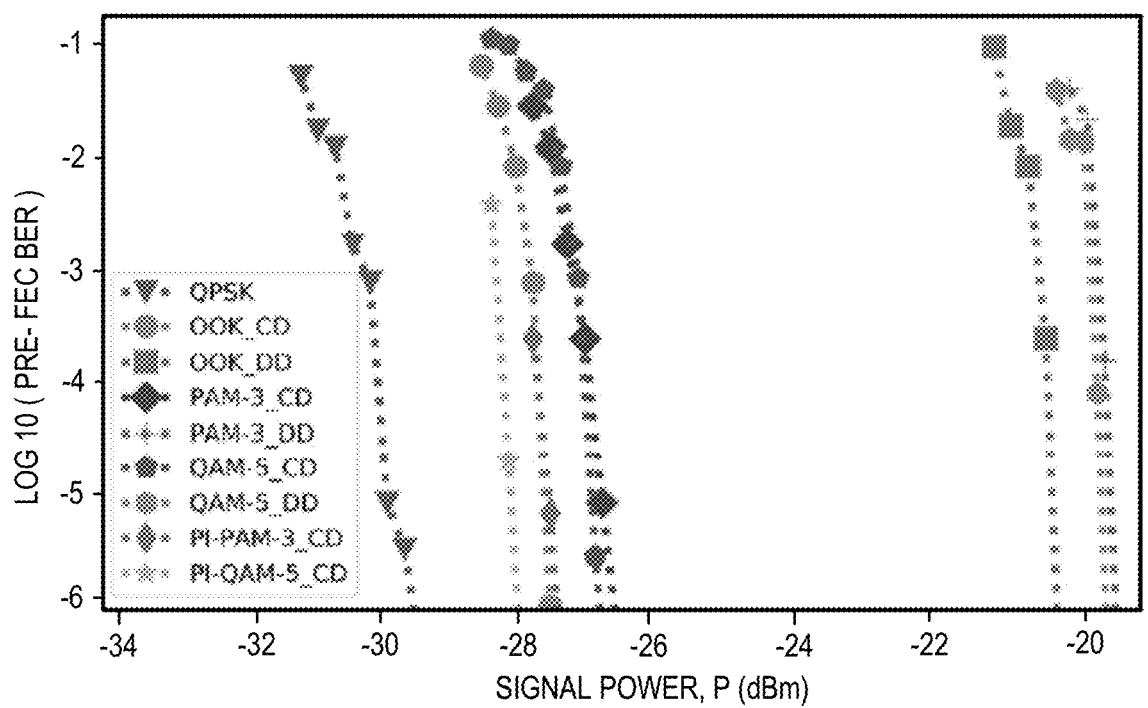

To demonstrate the advantages of modulation format and code rate adaptation, we report the post-FEC BER for different modulation formats and detection schemes, achieved via offline decoding. FIGS. 14-16 illustrate post-FEC BER versus received signal power for codes 1, 2, and 3, respectively. By comparing the CD and DD results, we conclude that CD can tolerate lower received signal power, as expected. In other words, even without any additional amplifier, the RRH node employing the CD technology will cover longer distances. However, equipping all RRH nodes with CD technology is a costly solution. Employing CD and DD in a hybrid network based on the required transmission distance and cover range would be a promising solution. By comparing OOK_CD, PAM-3_CD, and QAM-5_CD, we conclude that the pre-FEC BER performance of PAM-3 and QAM-5 is worse than that of OOK at CD receivers due to the imbalanced noise. However, the pre-FEC BER performance is significantly improved once the phase information improvement (PI) algorithm is employed. By comparing PAM-3_CD, QAM-5_CD, PI-PAM-3_CD, and PI-QAM-5_CD, we conclude that QAM-5 performs better than PAM-3. With a target post-FEC BER of $10^{-6}$, adaptive coding and hybrid detection enables us to cover a wide range of distances, corresponding to the received signal powers ranging from −29.5 dBm (with QPSK, code rate of 0.625, and CD) to −17 dBm (with PAM-3, code rate of 0.8, and DD). Considering a standard single mode fiber attenuation of 0.2 dB/km, the cover range can be as large as 62.5 km, which translates to less than 0.2 ms propagation latency. It satisfies the standardized round-trip latency budget of 3 ms for long-term evolution (LTE) standard and 200 μs for next generation radio-access technology (NR). While our design results in an extensive cover range with high capacity connections, cover ranges smaller than 62.5 km (without sacrificing connection capacities) are also a feasible choice if the latency requirements are more stringent. In other words, using probabilistically coded modulation and adaptive coding, we can ensure that optical-layer impairments do not affect the performance of the radio access network due to a limitation in capacity or transmission reach. In addition, the adaptive coding and modulation provide a finer granularity to the flexibility of the network.

Experimental Results—Uplink Transmission Performance

Figure 17:
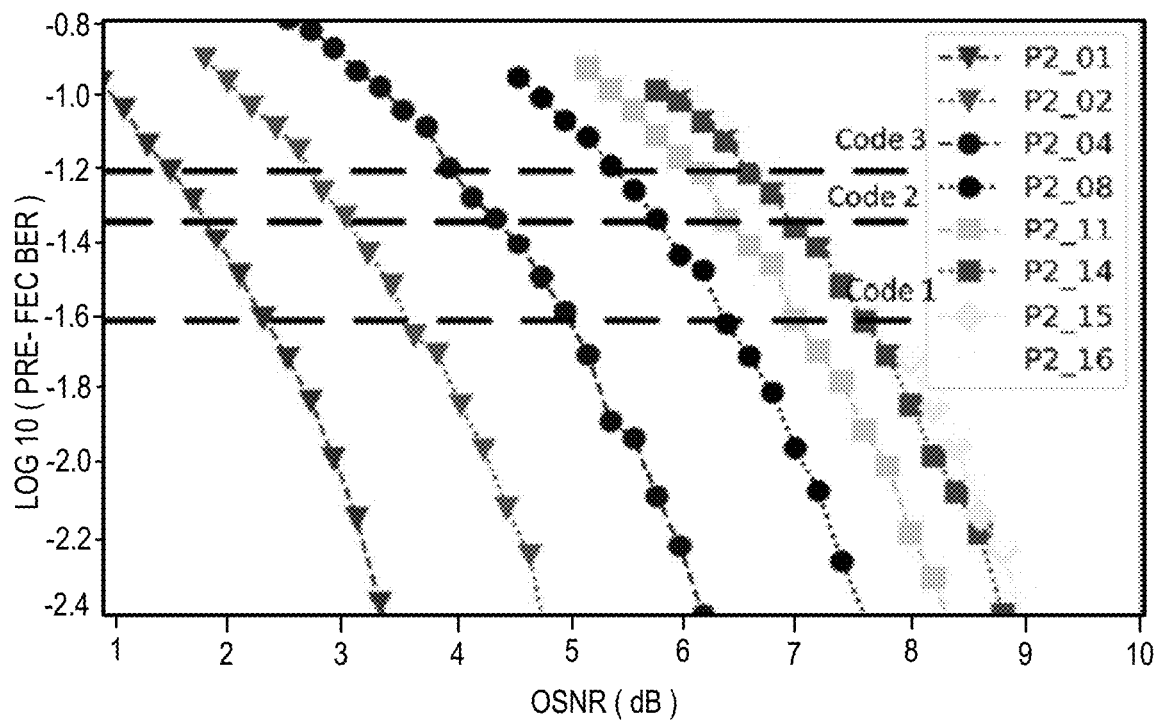
FIG. 17 illustrates the pre-FEC BER performance versus optical signal-to-noise ratio (OSNR) for different number of active RRHs.

To examine the adaptive uplink transmission performance in our wavelength-routing MFH network, we simulate a CDMA system employing a 16-bit Walsh-Hadamard code as the spreading code set. The system is operated under the AWGN channel assumption, with a laser wavelength of 1550 nm and a linewidth of 100 KHz. The sampling rate is 50 GS/s. We simulate the cases with 1, 2, 4, 8, 11, 14, 15, and 16 transmitters (i.e., RRHs). The optical powers of signal and noise are assumed to be equal before being combined together. Each RRH node's code is synchronized with a random misalignment of less than 0.25 times the symbol rate. In CDMA systems, the performance is mainly limited by multi-user interference as well as the Gaussian noise from each user. Considering OOK with DD, FIG. 17 illustrates the pre-FEC BER performance versus optical signal-to-noise ratio (OSNR) for different number of active RRHs.

The simulation results point to the high sensitivity of the uplink transmission performance to the number of active RRHs in the network. With the same noise power, a larger number of active RRHs leads to a higher pre-FEC BER at the BBU pool. In a realistic setting, the SDN controller needs to maintain the number of active RRHs with a small fluctuation. Comparing the pre-FEC BER values with 11, 14, 15, and 16 active RRHs in FIG. 17, it becomes clear that adaptive coding should be employed to satisfy the uplink quality of service with a guaranteed post-FEC BER.

Uplink Experimental Testbed Results

Figure 18:
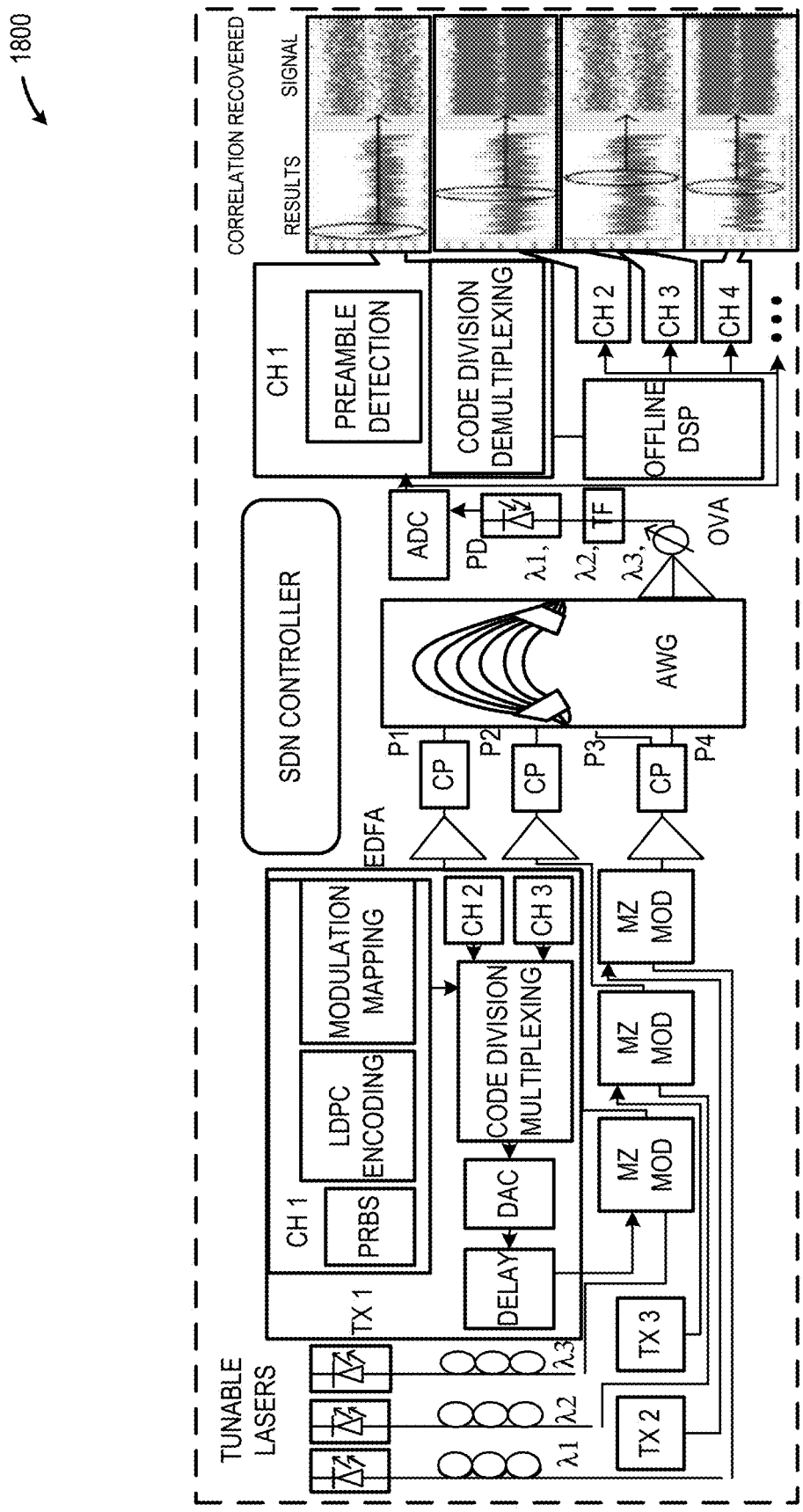
FIG. 18 illustrates an experimental testbed to verify the uplink transmission performance.

FIG. 18 illustrates an experimental testbed 1800 to verify the uplink transmission performance. Here three 10 kHz-linewidth, continuous-wave, tunable resources (with central frequencies f1=193.40 THz, f2=193.30 THz, and f3=193.35 THz) are applied to three Mach-Zehnder modulators.

One of the transmitters consists of multiple channels, a DAC, and the delay module within the DAC. We employ two Tektronix arbitrary waveform generators (AWGens), each with two output ports, to serve as three independent DACs with delay module. The value of the delay is controlled by the SDN controller. As in FIG. 18, one of the channels includes a PRBS generator, an LDPC encoder, and a modulation mapper. The generated PRBS is adaptively encoded with three LDPC codes (as described herein). The modulation mapper maps the encoded data into OOK symbols. As in our theoretical analysis, we use 16-bit Walsh-Hadamard code as the spreading code set for CDM. Three modulators convert the multiplexed CDM signals to optical signals. These signals are amplified by erbium-doped fiber amplifiers (EDFAs) of 6 dB noise figure. The amplified signals are applied to AWG (50 GHz grid 32×32 AWG) input ports 16, 17, 18. Based on the AWG routing pattern, they all appear on AWG output port 1. The wavelength-division multiplexed (WDM) signal is amplified once more before being applied to a direct-detection receiver. As in the downlink setup, the transmission distance is emulated by a VOA. Despite differences in the transmission distance, the signals from different channels are equalized (to within 1 dB difference) at the receiver.

Figure 19:
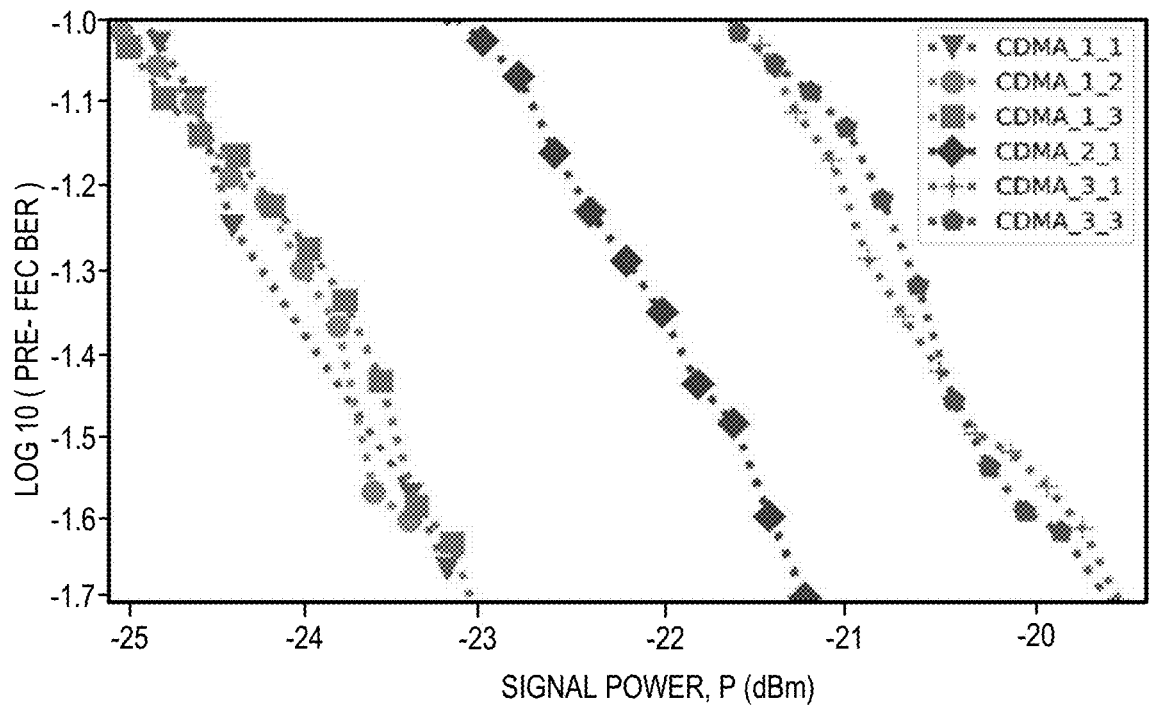
FIG. 19 illustrates uplink pre-FEC BER versus received signal power for different transmission scenarios.

FIG. 19 illustrates uplink pre-FEC BER versus received signal power for different transmission scenarios. Each curve is associated with a label of form CDMA_n_m, where n denotes the number of transmitters and m denotes the number of channels in each transmitter. The received power is evenly divided among the channels within the same transmitter. The results suggest that the penalty due to CDM in the electrical domain is negligible. However, in accordance with our simulation results, the number of active transmitters does have an impact on the BER performance. Fortunately, with code rate adaptation, the desired post-FEC BER can be met.

Figure 20:
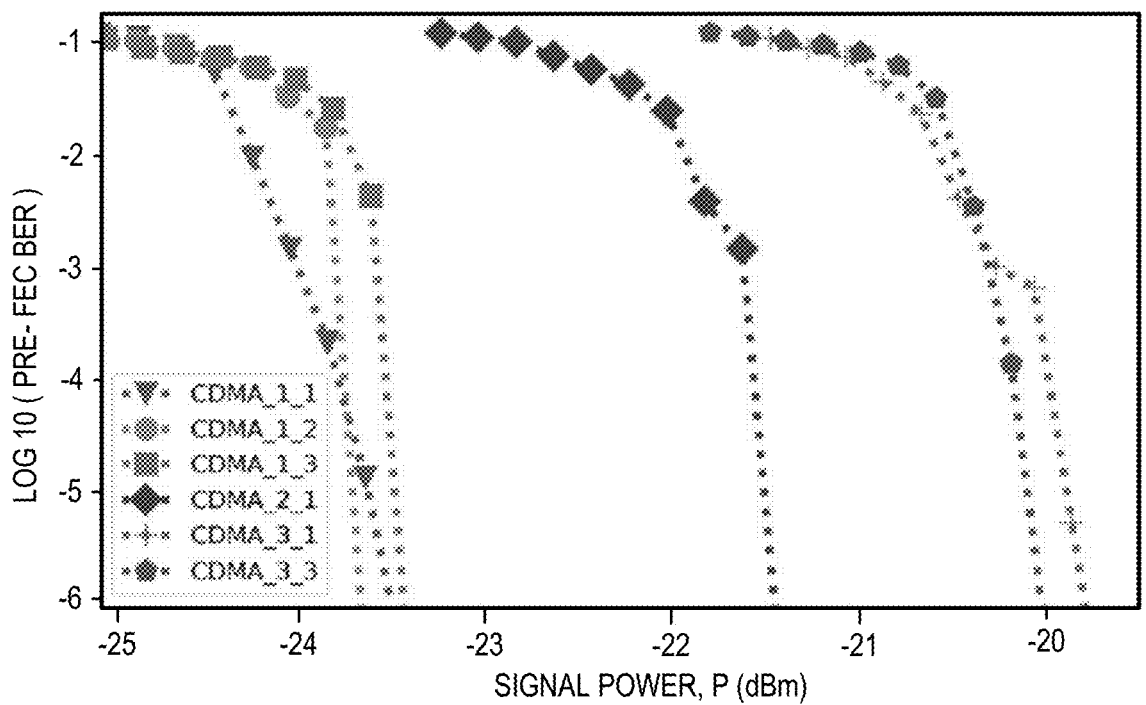
FIGS. 20-22 depict the offline LDPC decoding results for codes 1, 2, and 3, respectively.
Figure 21:
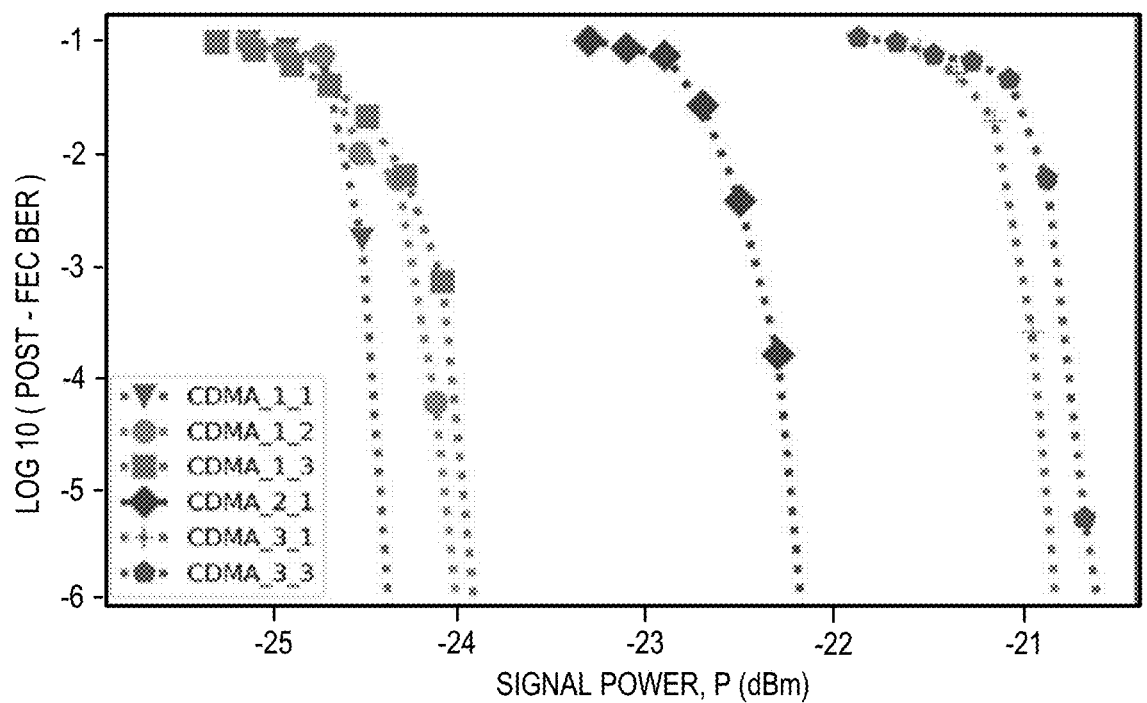
Figure 22:
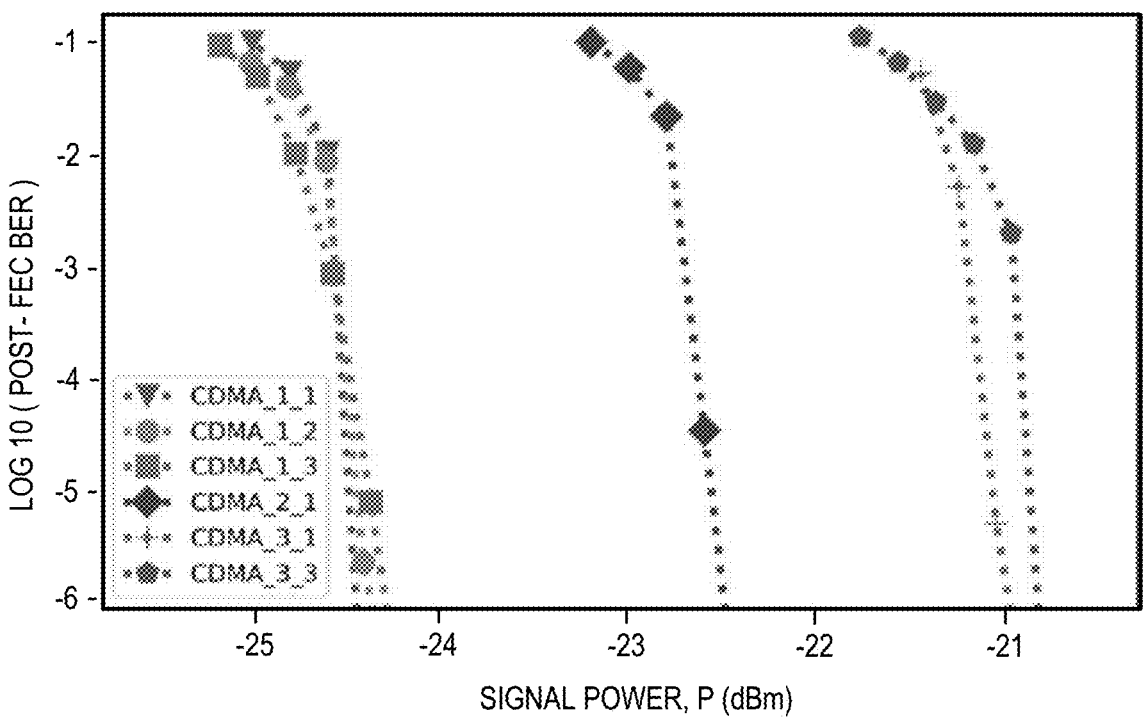

FIGS. 20-22 illustrate the offline LDPC decoding results for codes 1, 2, and 3, respectively. Based on these results, we conclude that the impact of adding and dropping a user will be less pronounced for a sufficiently large number of users. By employing adaptive coding in the uplink, the quality of service can be made independent from the power fluctuation caused by adding and dropping users.

Figure 23:
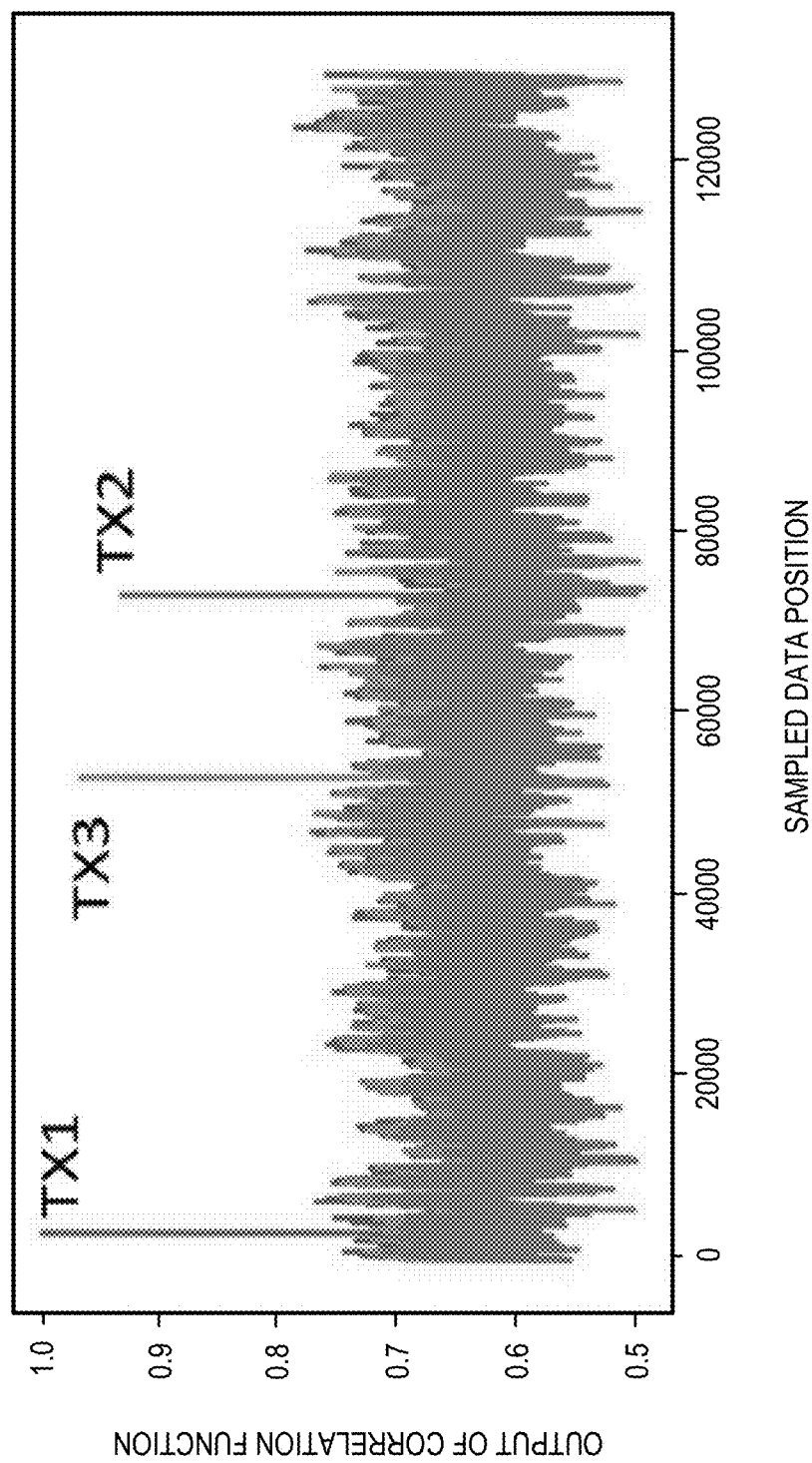
FIG. 23 illustrates the spreading code synchronization outcome, where the three peaks indicate the location of the spreading codes.

FIG. 23 illustrates the spreading code synchronization outcome, where the three peaks indicate the location of the spreading codes. The value of the output function is normalized with respect to the peak value of transmitter 1 (TX1). The peaks indicate the start of the first frame of each transmitter. By measuring the time interval between frame headers, the misalignment between two spreading codes will be determined and corrected by SDN controller. In our uplink control scheme, the amount of misalignment among transmitters is calculated by the SDN controller and is used for properly delaying the transmitted signals. By employing this scheme, the maximum misalignment between different transmitters in our experiment was less than 40 ps.

Accordingly, described herein probabilistically coded modulation formats for a programmable CD and DD hybrid 5G/6G (and beyond) MFH network. To support bidirectional multicast transmission among arbitrary BBUs and RRHs, the present disclosure provides improved PAM-3 and QAM-5 modulation formats. By probabilistically coding the phase degree of these constellations, FEC coding performance may be enhanced in CD RRHs without significant impairment in DD RRHs.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" may refer to, for example, software, firmware and/or circuitry configured to perform any of the aforementioned operations. Software may be embodied as a software package, code, instructions, instruction sets and/or data recorded on non-transitory, computer-readable storage devices. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored thereon, individually or in combination, instructions that when executed by circuitry perform one or more operations. Here, the circuitry may include any of the aforementioned circuitry including, for examples, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments,

What is claimed is:

1. A controller to control uplink and downlink communications between at least one baseband unit (BBU) and at least one remote radio head (RRH) in a mobile fronthaul (MFH) network, the controller comprising:
    pseudorandom seed generating circuitry to initialize a pseudorandom seeding in the at least one BBU and at least one RRH and to cause the at least one BBU and at least one RRH to generate a pair of matching pseudorandom bit sequences (PRBS), the matching PRBS to enable the at least one BBU and at least one RRH to synchronize communications therebetween;
    wavelength and route assignment circuitry to select a wavelength and to select a route, through the MFH network, to enable the at least one BBU and at least one RRH to communicate using the selected wavelength and route;
    error correction code and modulation format selection circuitry to select an error correction code and a modulation format for communications between the at least one BBU and at least one RRH;
    transmission configuration circuitry to encode one or more parameters of a physical layer in the MFH network into the PRBS; and
    bit error rate monitoring circuitry to monitor a data stream between the at least one BBU and at least one RRH to determine if a bit error rate has changed for each frame of the data stream.

2. The controller of claim 1, wherein the one or more parameters of the physical layer include at least one of a PAM-3 modulation format information, or QAM-5 modulation format information, a forward error correction code information, and a transmit power information.

3. The controller of claim 1, wherein selection of a wavelength and route includes selecting an output port of at least one BBU to enable the selected wavelength to pass through an arrayed waveguide grating circuitry associated with the physical layer.

4. The controller of claim 1, wherein the bit error rate monitoring circuitry also to adjust a strength or an iteration rate of the selected error code if a bit error rate has changed in the data stream.

5. The controller of claim 1, wherein the selected modulation format is a PAM-3 modulation format.

6. The controller of claim 5, wherein the transmission configuration circuitry is further to encode the data stream with phase information by determining:
if a current bit (n) and a previous bit (n−1) are both a value of 1, or if the current bit (n) and an n−2 bit are both a value of 1;
otherwise the transmission configuration circuitry excludes phase information.

7. The controller of claim 1, wherein the selected modulation format is a QAM-5 modulation format.

8. The controller of claim 7, wherein the transmission configuration circuitry is further to encode the data stream with phase information by determining:
if a current bit (n) and a previous bit (n−1) are both a value of 1, encoding a phase value of −1 to the current bit (n);
if the current bit (n) has a value of 1 and the previous bit (n−1) has a value of 0, encoding a phase value of −1 to the current but (n);
otherwise the transmission configuration circuitry excludes phase information.

9. The controller of claim 8, wherein the transmission configuration circuitry also to convert phase values for even bit indexes, from among the bits 1-n, into imaginary numbers; and to convert phase values for odd bit indexes, from among the bits 1-n, into real numbers.

10. The controller of claim 1, transmission configuration circuitry also to control a tunable filter, associated with the network, to pass the selected wavelength and to block other wavelengths.

11. A non-transitory storage device that includes machine-readable instructions that, when executed by one or more processors, cause the one or more processors to perform operations, comprising:
initialize a pseudorandom seeding in at least one BBU and at least one RRH in a mobile fronthaul (MFH) network, and to cause the at least one BBU and at least one RRH to generate a pair of matching pseudorandom bit sequences (PRBS), the matching PRBS to enable the at least one BBU and at least one RRH to synchronize communications therebetween;
select a wavelength and to select a route, through the MFH network, to enable the at least one BBU and at least one RRH to communicate using the selected wavelength and route;
select an error correction code and a modulation format for communications between the at least one BBU and at least one RRH;
encode one or more parameters of a physical layer in the MFH network into the PRBS; and
monitor a data stream between the at least one BBU and at least one RRH to determine if a bit error rate has changed for each frame of the data stream.

12. The non-transitory storage device of claim 11, wherein the one or more parameters of the physical layer include at least one of a PAM-3 modulation format information, or QAM-5 modulation format information, a forward error correction code information, and a transmit power information.

13. The non-transitory storage device of claim 11, wherein selection of a wavelength and route includes selecting an output port of at least one BBU to enable the selected wavelength to pass through an arrayed waveguide grating circuitry associated with the physical layer.

14. The non-transitory storage device of 11, wherein if a bit error rate has changed in the data stream, operations further comprise adjusting a strength or an iteration rate of the selected error code.

15. The non-transitory storage device of claim 11, wherein the selected modulation format is a PAM-3 modulation format.

16. The non-transitory storage device of 15, wherein operations further comprise,
determine if a current bit (n) and a previous bit (n−1) are both a value of 1, or
if the current bit (n) and an n−2 bit are both a value of 1; otherwise exclude phase information.

17. The non-transitory storage device of claim 11, wherein the selected modulation format is a QAM-5 modulation format.

18. The non-transitory storage device of 17, wherein operations further comprise:
determine if a current bit (n) and a previous bit (n−1) are both a value of 1,
encoding a phase value of −1 to the current bit (n);
determine if the current bit (n) has a value of 1 and the previous bit (n−1) has a value of 0, encoding a phase value of −1 to the current but (n);
otherwise exclude phase information.

19. The non-transitory storage device of 18, wherein operations further comprise: convert phase values for even bit indexes, from among the bits 1-n, into imaginary numbers; and to convert phase values for odd bit indexes, from among the bits 1-n, into real numbers.

20. The non-transitory storage device of 11, wherein operations further comprise: control a tunable filter, associated with the network, to pass the selected wavelength and to block other wavelengths.

* * * * *